(12) United States Patent
Swift et al.

(10) Patent No.: US 8,988,442 B2
(45) Date of Patent: *Mar. 24, 2015

(54) ASYNCHRONOUS NOTIFICATIONS FOR CONCURRENT GRAPHICS OPERATIONS

(71) Applicant: Apple Inc., Cupertino, CA (US)

(72) Inventors: Michael James Elliot Swift, San Francisco, CA (US); Kenneth Christian Dyke, Los Altos, CA (US); Richard Warren Schreyer, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/253,130

(22) Filed: Apr. 15, 2014

(65) Prior Publication Data
US 2014/0333636 A1 Nov. 13, 2014

Related U.S. Application Data

(63) Continuation of application No. 13/668,169, filed on Nov. 2, 2012, now Pat. No. 8,736,625, which is a continuation of application No. 11/811,337, filed on Jun. 7, 2007, now Pat. No. 8,310,491.

(51) Int. Cl.
*G06T 1/00* (2006.01)
*G06T 1/20* (2006.01)
*G06T 15/00* (2011.01)
*G09G 5/00* (2006.01)
*G09G 5/36* (2006.01)

(52) U.S. Cl.
CPC ............... *G06T 1/20* (2013.01); *G06T 15/005* (2013.01); *G09G 5/001* (2013.01); *G06T 2200/28* (2013.01); *G06T 2210/52* (2013.01); *G09G 5/363* (2013.01); *G09G 2352/00* (2013.01); *G09G 2360/06* (2013.01); *G09G 2370/08* (2013.01)
USPC ............................. 345/522; 345/502; 345/619

(58) Field of Classification Search
USPC .................................................. 345/505, 537
See application file for complete search history.

(56) References Cited

U.S. PATENT DOCUMENTS

| | | |
|---|---|---|
| 6,771,269 B1 | 8/2004 | Radecki |
| 6,956,579 B1 | 10/2005 | Diard et al. |
| 2006/0114260 A1 | 6/2006 | Diard |
| 2007/0103590 A1 | 5/2007 | Azar et al. |
| 2007/0115291 A1 | 5/2007 | Chen |
| 2008/0055321 A1 | 3/2008 | Koduri |
| 2010/0085365 A1* | 4/2010 | Campbell et al. ............. 345/502 |
| 2010/0118039 A1* | 5/2010 | Labour ......................... 345/522 |

* cited by examiner

*Primary Examiner* — Phi Hoang
(74) *Attorney, Agent, or Firm* — Blakely, Sokoloff, Taylor & Zafman LLP

(57) ABSTRACT

A method and an apparatus for notifying a display driver to update a display with a graphics frame including multiple graphics data rendered separately by multiple graphics processing units (GPUs) substantially concurrently are described. Graphics commands may be received to dispatch to each GPU for rendering corresponding graphics data. The display driver may be notified when each graphics data has been completely rendered respectively by the corresponding GPU.

35 Claims, 22 Drawing Sheets

ASYNCHRONOUS NOTIFICATIONS FOR CONCURRENT GRAPHICS OPERATIONS

This application is a continuation of co-pending U.S. application Ser. No. 13/668,169 filed on Nov. 2, 2012, which is a continuation of U.S. application Ser. No. 11/811,337 filed on Jun. 7, 2007, now issued as U.S. Pat. No. 8,310,491.

FIELD OF INVENTION

The present invention relates generally to graphics processing. More particularly, this invention relates to asynchronous notifications for graphics operations.

BACKGROUND

As more and more media processors are coupled through a common memory system to share graphics content for performing graphics operations separately, it is becoming more and more expensive to allow one media processor, such as a graphics processing unit (GPU), to consume the result produced by another media processor. Usually, these media processors may be capable of handling 2D, 3D, Video and/or display command streams driven by API (application programming interface) calls from a graphics application. A host processor such as a central processing unit (CPU) is typically required to explicitly synchronize these graphics operations by stopping one media processor and starting another one when switching between APIs. Such synchronization is usually very costly and prevents simultaneous, parallel execution of a separate media processors.

In particular, a media processor may be driven by a system on a chip requiring a host processor included in the chip to respond to an interrupt signifying the completion of individual hardware graphics operations such as a single copy operation or a single solid color fill operation. However, responding to a single interrupt per operation can be expensive. Furthermore, interrupts may prevent simultaneous execution of media processors and a host processor. Consequently, the overall performance is degraded with lower parallelism.

On the other hand, multiple media processors and a display device coupled with a common memory system may require synchronization. For example, more than one component of a graphics content may arrive asynchronously from separate media processors to be displayed in a display device for a single application. Executing a graphics command to display the graphics content may depend on when each component is properly rendered and ready to display. Apparently, it is necessary to ensure maximum parallelism among multiple media processors to allow rendering different components for the same graphics content in a synchronous manner.

Additionally, parallel operations between a host processor and coupled media processors may be limited by a bottleneck introduced when deleting commonly shared graphics resources. Typically, media processor drivers ensure the media processors are idle prior to deleting graphics resources such as allocated memories, memory management unit (MMU) entries, the textures etc., that might otherwise be in use by pending graphics operations. This, however, prevents parallel operations by the host processor and media processors.

Furthermore, graphics rendering operations such as scaling may be limited by a fixed number of fractional precision in media processor hardware for arithmetic representations. Often, the bit-precision of the scale factor is limited to optimize mathematical operations inside the media processor hardware to allow a multiplication instead of a division which may be more expensive. For example, a scale factor may be inversely represented through a limited bit-precision fixed-point arithmetic. As a result, a limiting factor is introduced that certain scale factors cannot be represented accurately.

SUMMARY OF THE DESCRIPTION

An embodiment of the present invention includes a method and apparatus that notify a display driver to update a display with a graphics frame including multiple graphics data rendered separately by multiple graphics processing units (GPUs) substantially concurrently. Graphics commands may be received to dispatch to each GPU for rendering corresponding graphics data. The display driver may be notified when each graphics data has been completely rendered respectively by the corresponding GPU.

In an alternative embodiment, a display is updated with a graphics frame including multiple graphics data after receiving a plurality of synchronization messages. The graphics frame may include multiple graphics data associated with separate GPUs. A separate synchronization message may be received from each graphics driver associated with a GPU to indicate the graphics data corresponding to the GPU has been completely processed. Multiple GPUs may process corresponding graphics data substantially concurrently.

In another alternative embodiment, a display is updated with a graphics frame when synchronization commands for a plurality of segments of the graphics data associated with the graphics frame have been received. A swap command may be received from a graphics API to identify a plurality of graphics commands for rending the plurality of segments of graphics data by a plurality of GPUs substantially concurrently. A synchronization command may be received from each GPU to indicate the respective GPU has completed processing the corresponding segment of graphics data associated with the GPU. Updating the display may be suspended until all of the synchronization commands are received. A synchronization command may be examined to determined whether it is the last one representing the last segment of the graphics data processed by the GPUs.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for processing graphics commands in graphics processors are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Figure 1A:
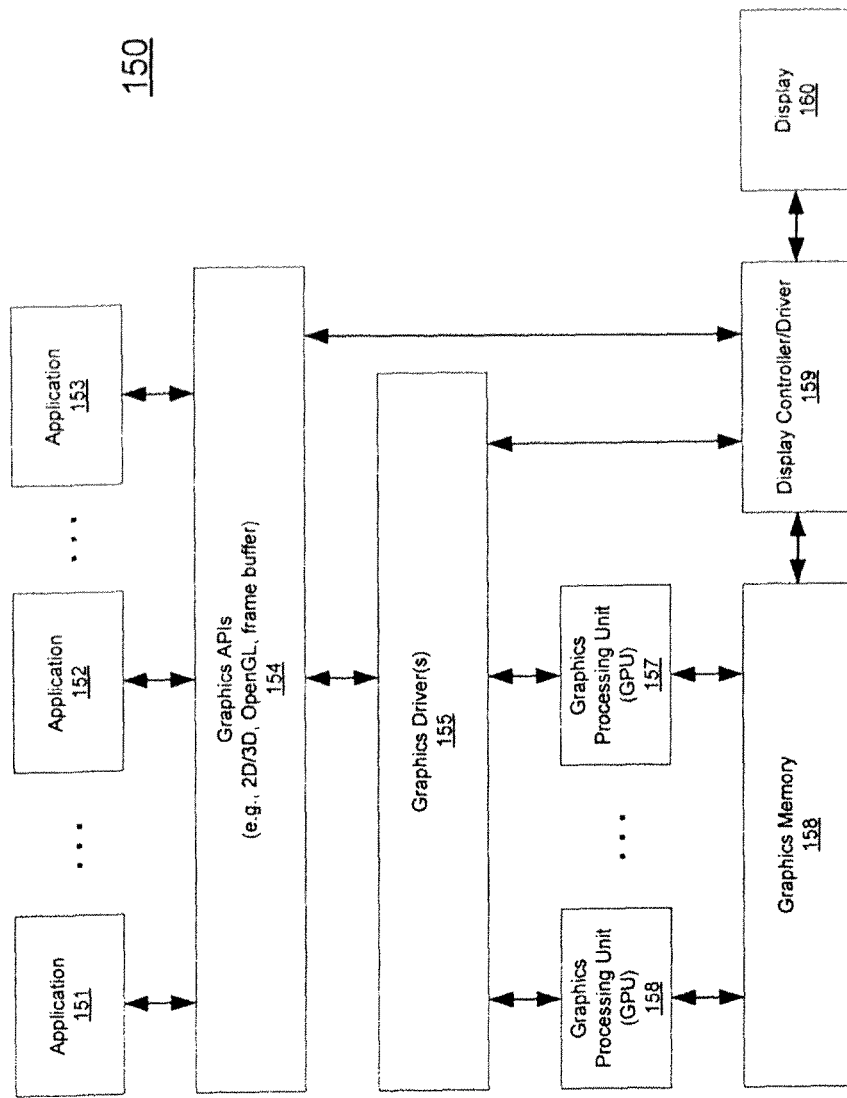
FIGS. 1A and 1B are is a block diagrams illustrating one embodiment of a system for a graphics driver to process graphics command streams from a graphics application to a graphics processor.
Figure 1B:
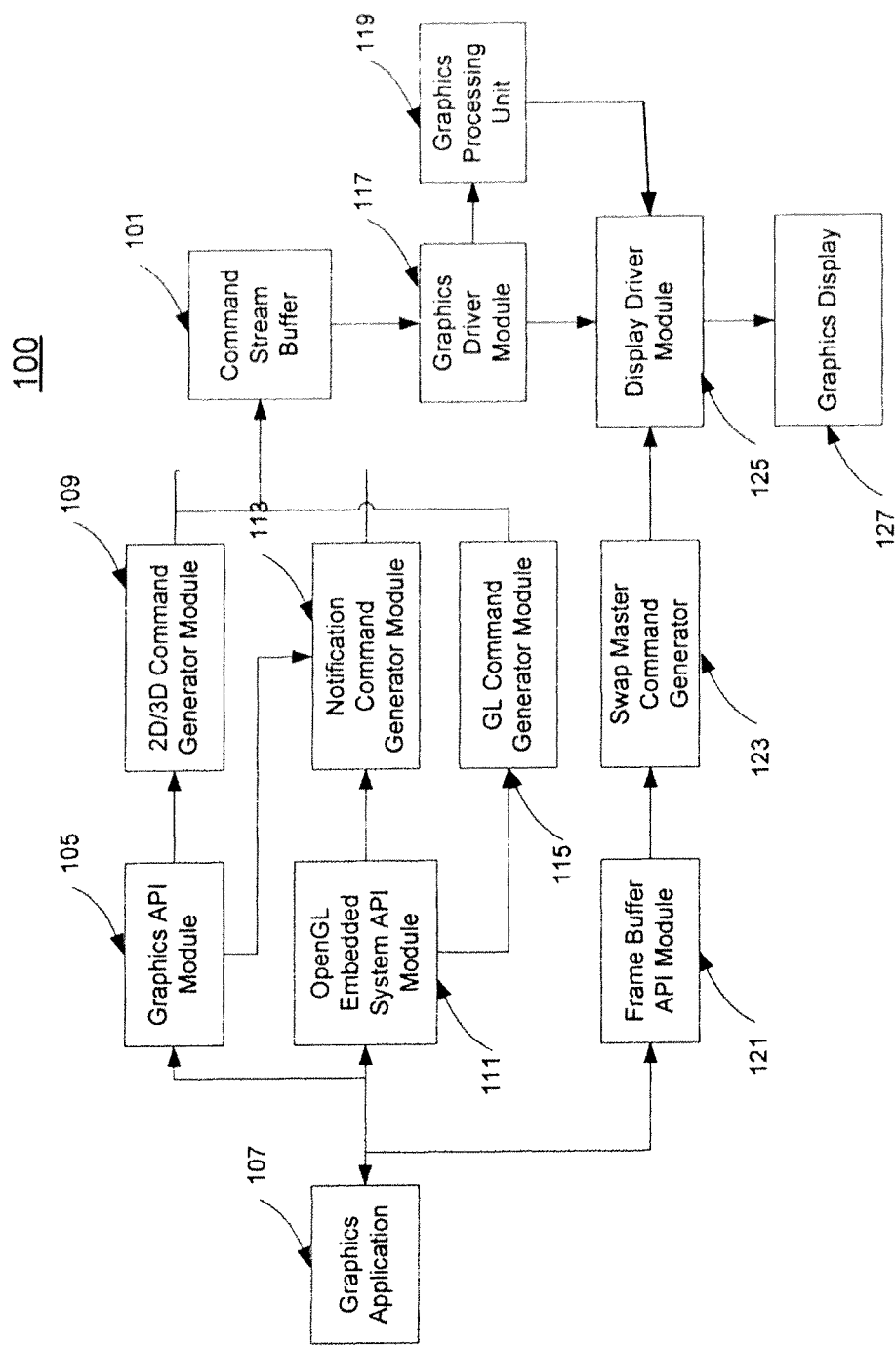

FIG. 1A is an overview of a graphics processing subsystem according to one embodiment of the invention. Referring to FIG. 1B, according to one embodiment, system 150 includes one or more applications 151-153 (e.g., graphics related applications such as media player software, etc.) communicatively coupled to one or more graphics APIs (application programming interfaces) 154, such as, for example, 2D/3D, OpenGL, and frame buffer APIs. The graphics APIs are communicatively coupled to one or more graphics drivers 155 that provide interfaces to one or more graphics processing units (GPUs) 156-157. The GPUs 156-157 may process graphics data substantially concurrently and asynchronously. Each of the GPUs may include one or more core logics such as 2D (two dimensional) core and/or 3D (three dimensional) core that process different types of graphics data and may use different kinds of graphics resources. The output of the GPUs 156-157 (e.g., rendered graphics data) may be stored in graphics memory 158, which may be fetched by display controller/display driver 159 to be displayed in a display 160.

According to one embodiment, graphics driver 155 fetches graphics commands from a command stream buffer (not shown) that receives the graphics commands from applications 151-153. In response to the received graphics commands, the graphic driver 155 may determine the resources required by the graphics commands and their relationships such as graphics resources dependencies. The graphics driver 155 may send multiple graphics commands to a GPU if there is no resource conflict among the graphics commands; otherwise, the graphics driver 155 may send one command at a time to a GPU, dependent upon the availability of hardware resources of the GPU. For example, graphics driver 155 may send multiple 2D commands to a GPU. However, graphics driver 155 can only send one 3D command at a time or alternatively, any 2D commands would not be sent until a previously sent 3D command has been executed.

In addition, graphics driver 155 further includes a resource management functionality to keep track what graphics commands have been sent to a GPU and how many of those commands have been executed by the GPU. The graphics driver 155 further keep track of the graphics resources (e.g., memory) used by the commands. In one embodiment, the graphics resources used by a graphics command would not be freed or released until the graphics command has been executed by the GPU.

Further the graphics driver 155 and/or graphics APIs 154 may communicate with display controller or display driver 159, for example, via an interrupt. In one embodiment, each of the GPUs 156-157 processes the graphics data concurrently and asynchronously. For example, multiple GPUs may process multiple components of a video frame concurrently. However, the video frame would not be displayed or updated (e.g., refresh) until all of the components have been processed by the GPUs. The communications between the graphics APIs 154 and graphics driver 155 with the display controller 159 would allow the display controller 159 to synchronize, for example, via a swap command or a swap ID, all of the processed components before display the video frame in the display 160.

Serializing Command Streams for Graphics Processors

According to certain embodiments of the invention, graphics commands may be serialized to allow one or more media processors to process graphics data in an optimal and efficient manner. Each media processor may be a dedicated hardware chip to, for example, process graphics data according to a stream of graphics commands. A driver for a media processor may serialize graphics commands for the media processor to execute. In one embodiment, a stream of graphics commands may be generated from multiple graphics applications via one or more graphics APIs (Application Programming Interface). The stream of graphics commands received in a media processor may include multiple types of graphics commands, such as 2D graphics commands or 3D graphics commands. In one embodiment, serializing the stream of graphics commands may allow the media processor to execute graphics commands of the same type in an order in which these graphics commands have been received without requiring synchronization interrupts. In another embodiment, serializing graphics commands may prevent one graphics API from running while another is constructing a new graphics command stream. Multiple media processors may execute serialized graphics command streams substantially concurrently with minimum synchronization interrupts from an associated host processor.

FIG. 1B is a block diagram illustrating one embodiment of a system for a graphics driver to serialize graphics command streams from a graphics application to a graphics processor. In one embodiment, referring to FIG. 1B, system 100 may be a graphics system including a separate host processor (e.g. CPU) and a media processor. A graphics application 107 may be executed in the host processor while a graphics processing unit 119 may reside in the media processor. Although one graphics processing unit is shown herein, it will be appreciated that multiple graphics processing units may be implemented, where multiple graphics processing units may process graphics data or commands asynchronously and/or concurrently. In one embodiment, a graphics application 107 may call graphics APIs via graphics libraries in an operating framework hosted by a host processor. Graphics libraries may provide multiple API modules supporting a variety of graphics APIs with varied functions and/or complexities, such as graphics module 105, OpenGL (Open Graphics Language) embedded system API module 11, and frame buffer API module 121, etc. Although one graphics application is illustrated, it will be appreciated that multiple applications may concurrently access the graphics APIs. Similarly, other graphics APIs apparent to those with ordinary skills in the art may also be implemented. In one embodiment, system 100 may be implemented in a "system on a chip or SOC" design, which is useful in a hand-held device such as a laptop computer or a media player.

Figure 2:
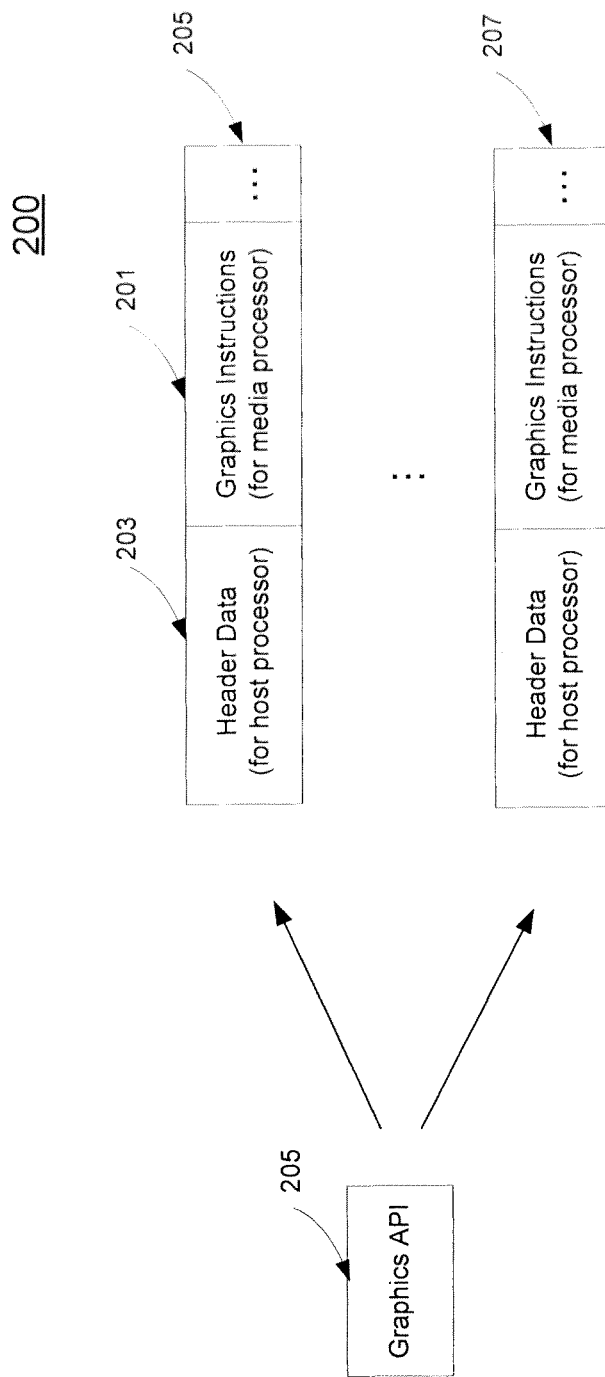
FIG. 2 illustrates an example of a graphics API (Application Programming Interface) generating multiple graphics commands.

FIG. 2 illustrates an example of a graphics API for generating multiple graphics commands according to one embodiment of the invention. The graphics API 205 in FIG. 2 may be based on, for example, the system of FIG. 1B. In one embodiment, graphics API 205 may generate multiple graphics commands such as commands 205 and 207. Each graphics command may include a header data 203 and graphics instructions or command 201. A header data in a graphics command may be extracted by a graphics processing module running in a host processor of a graphics system, such as a graphics driver 117 for a graphics processing unit 119 of FIG. 1B. In one embodiment, header data may include graphics resource information for the associated graphics command and/or marking data such as swap ids, notification ids or destination module ids, etc. Graphics instructions may be associated with hardware graphic commands for a media processor or graphics processor.

Referring back to FIG. 1B, in one embodiment, a graphics API may generate one or more graphics commands through a graphics command generator. For example, a graphics API module 105 may generate 2D or 3D graphics commands through a 2D/3D command generator module 109 for simple yet efficient graphics rendering functionalities, such as 2D blit, copy, scaling, filter or 3D primitive operations. APIs in an OpenGL embedded system API module 111 may implement OpenGL functionalities to generate GL graphics commands through a GL command generator module 115. GL graphics commands may be associated with OpenGL functionalities based on an OpenGL state machine. In one embodiment, a notification command generator module 113 may be coupled with the graphics API module 105 and an OpenGL embedded system API module 111 to generate notification commands. Graphics operations across different graphics processing units may be synchronized through notification commands generated according to parameters associated with graphics API calls. In one embodiment, an application may call APIs in a frame buffer API module 121 for displaying a processed frame by generating a swap command through a swap master command generator 123. A swap command may include dependency conditions on graphics resources and graphics operations to display an associated frame buffer. In one embodiment, a swap command may be associated with a swap id and a plurality of associated notification ids. A swap master command generator 123 may forward a swap command to a display driver module 125 associated with a graphics display device 127. The display driver module 125 may receive notification messages from other graphics drivers, such as graphics driver module 117, to determine a condition to display a graphics frame according to swap ids and a notification ids extracted from the received notification messages.

According to one embodiment, 2D, 3D, GL and notification graphics commands may be stored in a command stream buffer 101. One or more graphics commands may be arranged in the command stream buffer 101 according to a sequence of graphics API calls from applications. A command stream buffer 101 may be associated with a graphics processing unit 119 through a graphics driver module 117. For example, a graphics API may request for a command stream buffer. In response to the request, the associated graphics driver allocates a segment of memory or buffer and passes the handle or pointer back to the graphics API such that the graphics API can store the graphics commands received from an application in the allocated command stream buffer. A graphics command generator may be coupled with more than one command stream buffer associated with more than one graphics processing units. In one embodiment, the graphics processing unit 119 may be a media or graphics processor separate from the host processor hosting the command stream buffer 101. The graphics driver module 117 may retrieve graphics commands from the command stream buffer 101 in an FIFO (First In First Out) order as stored in the command stream buffer 101. In one embodiment, a graphics driver module 117 may schedule processing a retrieved graphics command according to a header data, such as header data 203 in FIG. 2, extracted from the retrieved graphics command. A graphics driver module 117 may forward hardware graphics commands based on graphics instructions extracted from a graphics command, such as graphics instructions 201 in FIG. 2, to be executed in a graphics processing unit 119. In one embodiment, the graphics driver module 117 may attach additional data, known privately to a kernel or hardware specific but not available for an application, to the hardware graphics commands forwarded to the graphics processing unit 119. In one embodiment, the graphics driver module 117 may process a graphics notification command by sending a notification message to a display driver module 125.

Figure 3:
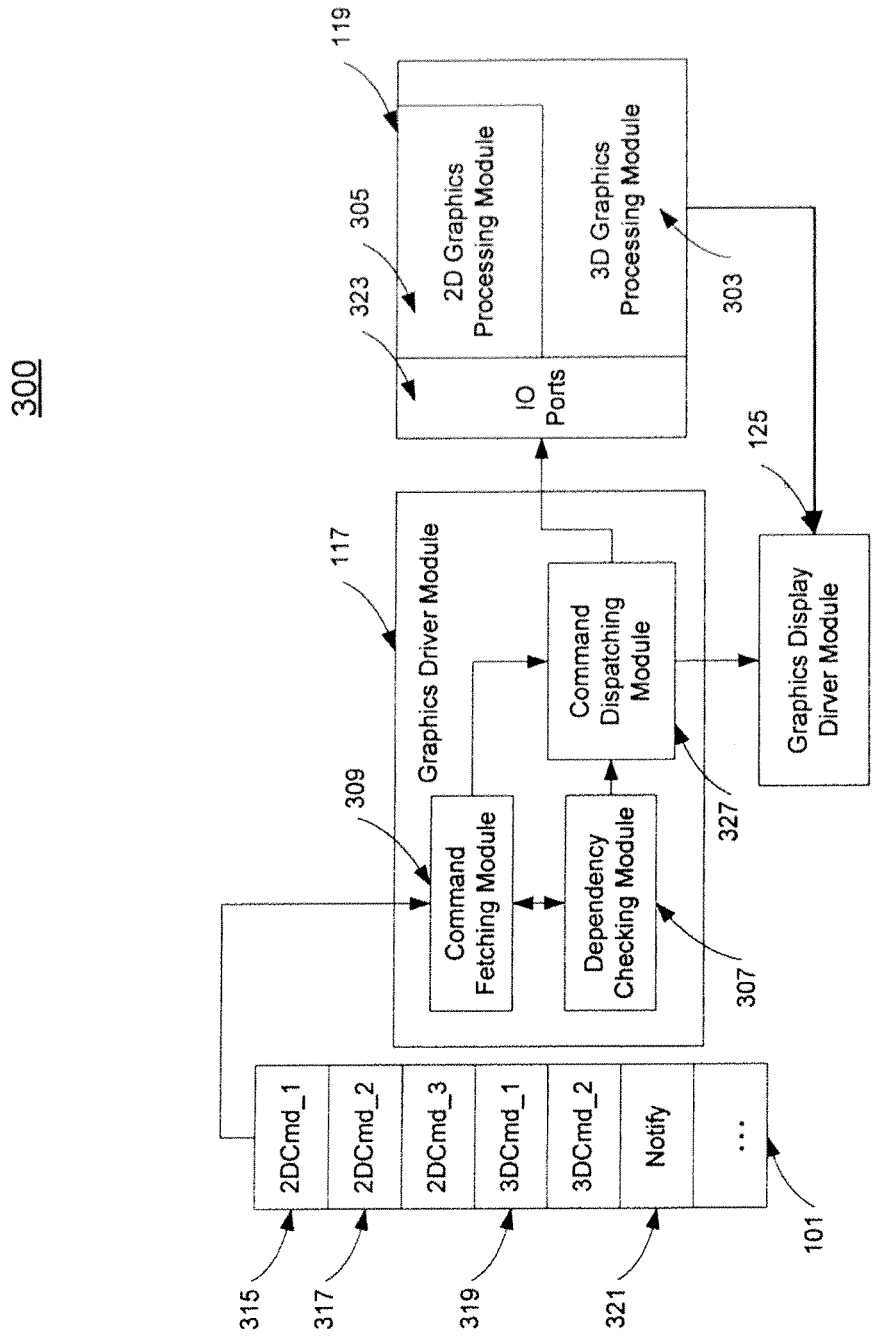
FIG. 3 is a block diagram illustrating one embodiment of a system in a graphics driver to process graphics command streams to a graphics processor.

FIG. 3 is a block diagram illustrating one embodiment of a system in a graphics driver to process sending graphics command streams to a graphics processor. In one embodiment, referring to FIG. 3, the system of FIG. 3 may be implemented as part of system 100 of FIG. 1B include, for example, command stream buffer 101, graphics driver module 117, display driver module 125 and graphics processing unit 119 of FIG. 1B. An ordered list of graphics commands including 2DCmd_1 315 to Notify 321 may be stored in the command stream buffer 101 according a receiving sequence. For example, graphics command 2DCmd_1 315 may be received by the command stream buffer 101 earlier than 2CCmd_2 317. Graphics commands 2DCmd_1 315 to Notify 321 may be received from command generator modules, such as 2D/3D command generator module 109 and notification command generator module 113 of FIG. 1, according to API calls to graphics API modules, such as graphic API module 105 of FIG. 1B. In one embodiment, the command stream buffer 101 may store the ordered list of graphics commands as a linked list.

A command fetching module 309 in the graphics driver module 117 may retrieve graphics commands from the command stream buffer 101 according to an order the graphics commands have been stored, such as FIFO. In one embodiment, the command fetching module 309 may retrieve the next graphics command from the command stream buffer according to a status of the associated graphics processing unit 119 and/or dependency conditions identified from previously received graphics commands. The status of a graphics processing unit may include an indication on the availability of associated hardware resources, such as a hardware FIFO buffer for receiving processing instructions. In one embodiment, the status of a graphics processing unit may be obtained based on values of predetermined memory locations, such as a status register associated with the graphics processing unit. The command fetching module 309 may proceed fetching the next graphics command as instructed by a dependency checking module 307.

A dependency checking module 307 may extract header data from a retrieved graphics command to determine if an associated graphics resource has been allocated in a memory coupled to the graphics processing unit 119. In one embodiment, a memory for allocating graphics resources may be coupled to both the graphics processing unit 119 and the host processor hosting the graphics driver module 117. The dependency checking module may notify a memory management module to allocate required graphics resources. In one embodiment, the dependency checking module may compare the graphics instructions carried by the retrieved graphics command with graphics instructions from previously retrieved graphics commands to determine if a dependency condition exists for the current graphics command. In one embodiment, forwarding graphics instructions of a 2D graphics command to a graphics processing unit may depend on when graphics instructions of a previous 3D graphics command are completely executed in the same graphics processing unit.

A command dispatching module 327 may forward hardware graphics commands based on graphics instructions from a retrieved graphics command to the graphics processing unit 119. In one embodiment, the command dispatching module 327 may send the graphics processing unit 119 with additional kernel level data associated with the hardware graphics commands, such as interrupt addresses or callback addresses. The command dispatching module 327 may send notification messages to a graphics display driver module 125 for a retrieved graphics notification command. In one embodiment, a notification message may inform the graphics display driver module 125 readiness of one condition for displaying a frame buffer. The command dispatching module may not initiate sending commands or messages if corresponding dependency conditions are not satisfied according to a dependency checking module 307. In other embodiments, a command dispatching module may generate a synchronization instruction appended to hardware graphics commands for a processing unit to notify a graphics driver module the completion of executing the hardware graphics commands. The notification may signify that a hardware buffer for an IO port of a graphics processing unit is emptied.

In one embodiment, a graphics processing unit 119 may include IO ports 323 coupled to graphics core logics, such as, for example, a 2D graphics processing module 305 and a 3D graphics processing module 303. IO ports 323 may buffer hardware graphics commands received. The size of a hardware buffer associated with IO ports 323 may limit the maximum number of hardware graphics commands allowed at a time. In one embodiment, a 2D graphics processing module and a 3D graphics processing module may be based on separate hardware components for a graphics processing unit 119. IO ports 323 may forward 2D and 3D graphics instructions received from hardware graphics commands to 2D graphics processing module 305 and 3D graphics processing module 303 respectively. In one embodiment, a 2D graphics processing module 305 and a 3D graphics processing module 303 may not operate at the same time in a graphics processing unit 119. In another embodiment, a 2D graphics processing module may process multiple 2D graphics instructions from one or more 2D graphics commands at one time (e.g. a batch). In other embodiments, a 3D graphics processing module may not process 3D graphics instructions from another 3D graphics command before finishing processing 3D graphics instructions for a current 3D graphics command (e.g. one graphics command at a time).

Figure 4:
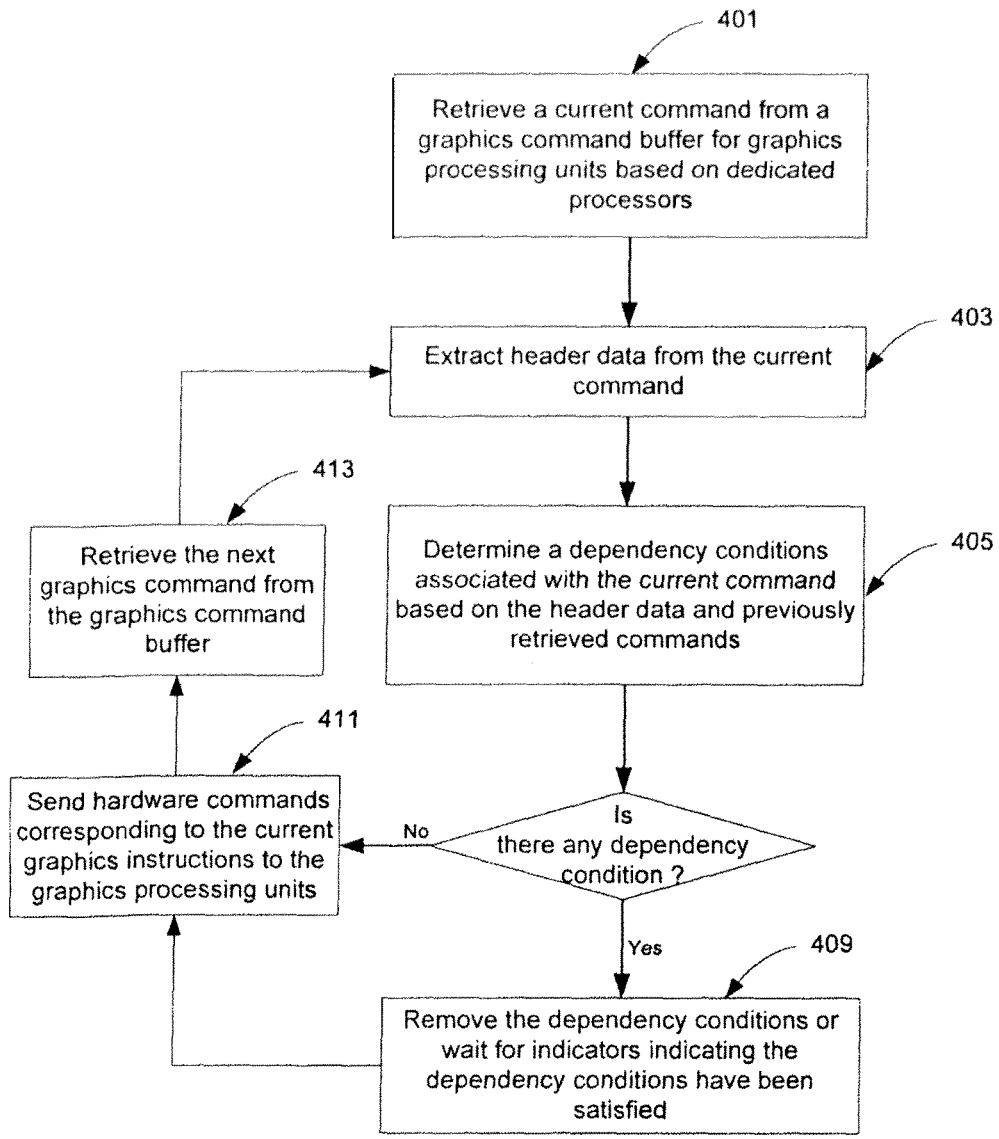
FIG. 4 is a flow diagram illustrating an embodiment of a process performed in a graphics driver to process command streams.

FIG. 4 is a flow diagram illustrating an embodiment of a process performed in a graphics driver to serialize sending command streams. Process 400 may be performed in accordance with the graphics driver 117 of FIGS. 1 and 3. In one embodiment, process 400 may retrieve graphics commands from a command buffer at block 401 according to an order in which the graphics commands have been stored in the command buffer, such as FIFO. Process 400 may be associated with graphics processing units which may perform graphics processing based on retrieved graphics commands in dedicated processors, such as graphics processors or media processors. In one embodiment, process 400 may be associated with a single graphics processing unit.

At block 403, in one embodiment, process 400 may extract header data from a currently retrieved graphics command. A header data in a graphics command, such as header data 203 of FIG. 2, may include information on graphics resources to be processed according to graphics instructions in a graphics command, such as read surfaces, write surfaces or other graphics objects. Additionally, header data may include marking data such as ids for messages and resources associated with the graphics command. A graphics resource, such as a surface or a texture, may be identified by a graphics id. Notification ids may be sent between graphics drivers for separate graphics processing units and/or display processing units for synchronizing graphics processing and display. Notification ids may be associated with graphics notification commands. Separate notification ids may be grouped together based on a swap id for displaying a graphics buffer, where a swap ID may be associated with an image or a frame to be displayed in a display.

At block 405, in one embodiment, process 400 may determine if there are dependency conditions associated with a currently retrieved graphics command. When dependency conditions are satisfied or removed, process 400 may proceed to send hardware graphics commands or notification messages associated with a graphics command. Dependency conditions for a retrieved graphic command may be determined based on header data included in the retrieved graphic command and/or previous retrieved graphics commands. For example, if it is determined that a current command depends on a previous command (e.g., graphics resource dependency), the current command will be held off until the previous command has been processed by the hardware. Otherwise, both current and previous commands may be sent down to the hardware for executions. In a particular embodiment, when a first command is a 3D graphics command and a second command received subsequently is a 2D graphics command, the second command will not be sent to the hardware until the first command has been processed by the hardware. In another particular embodiment, if both first and second commands are 2D graphics commands, both the first and second commands may be sent to the hardware as a batch for execution, where the hardware may buffer both commands during the execution. Other configurations may exist dependent upon a specific design of a graphics processing unit.

Figure 5:
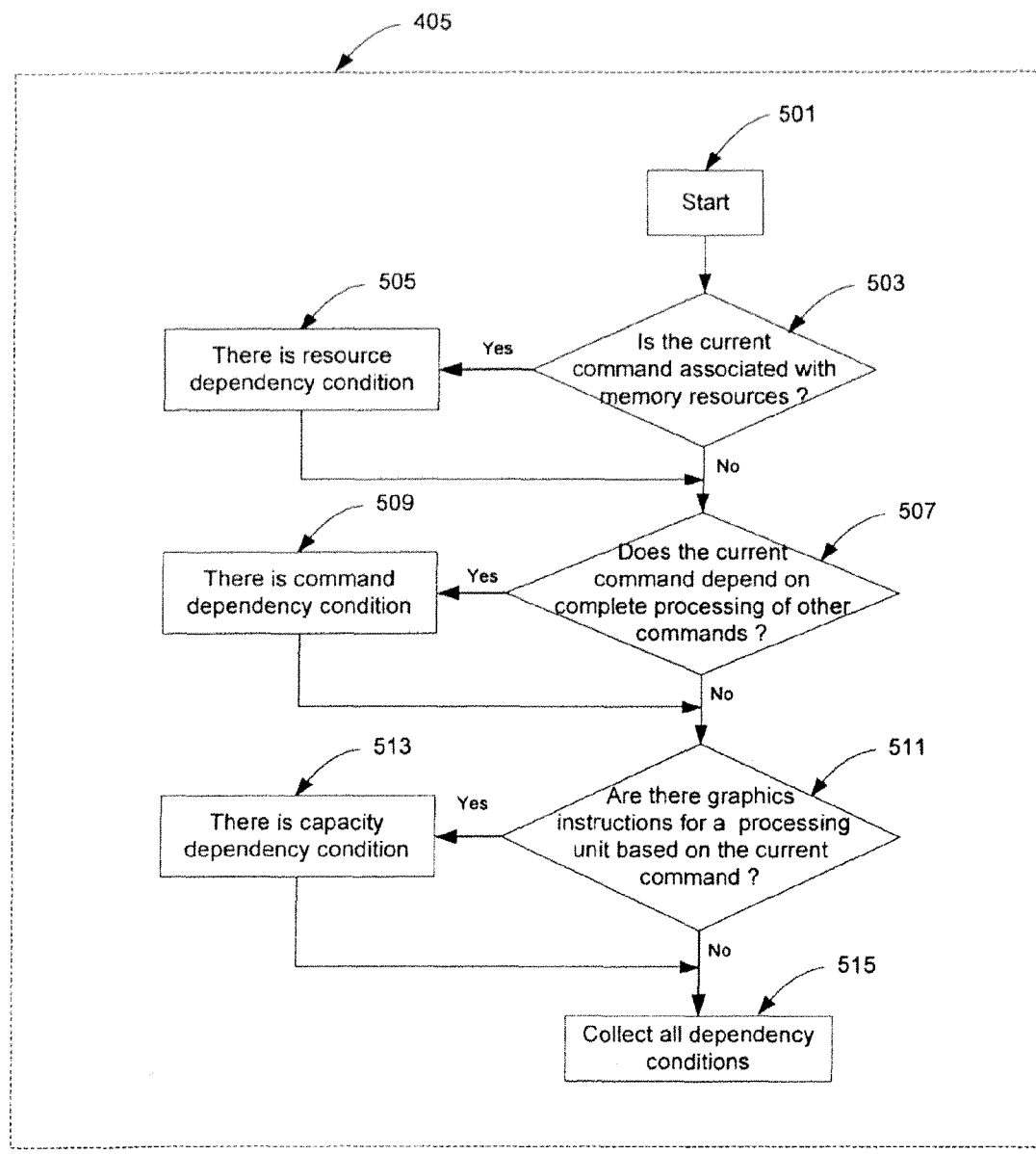
FIG. 5 is a flow diagram illustrating one embodiment of a process performed by a graphics system to determine a dependency relationship for graphics commands.

FIG. 5 is a flow diagram illustrating one embodiment of a process performed by a graphics system to determine a dependency relationship of graphics commands. For example, process 500 may be performed as part of process 400 at block 405 of FIG. 4. In one embodiment, referring to FIG. 5, process 500 may start at block 501 after process 400 performing block 403 in FIG. 4. At block 503, process 500 may determine if the currently retrieved graphics command is associated with a memory resource, such as a graphic surface or texture to be operated on graphics instructions. A resource dependency condition may be associated with a graphics resource identified by a graphics id in a header of a graphics command 505. In one embodiment, 2D, 3D and/or OpenGL graphics processing commands may have dependency conditions on associated graphics memory resources to be operated on.

At block 507, process 500 may determine if a currently retrieved graphics command depends on previously retrieved graphics commands. A command dependency condition may exist for a currently retrieved graphics command depending on a previously retrieved graphics command being completely processed 509. In one embodiment, sending a current command to a graphics processing unit or another graphics driver module may require a graphics processing unit to complete processing previously retrieved graphics commands. For example, a currently retrieved graphics command may have a dependency on a previous retrieved 3D graphics command. A currently retrieved 3D graphics command may have a dependency condition on a previously retrieved 2D graphics command. A currently retrieved graphics command may have a dependency on a previously retrieved OpenGL graphics command. At block 511, process 500 may determine a capacity dependency condition 513 on an associated graphics processing unit if there are graphics instructions included in a currently retrieved graphics command to send to the graphics processing unit. In one embodiment, a capacity dependency condition may be associated with available processing capacity of a graphics processing unit. A status of processing capacity may be related to number of empty slots of a hardware buffer for an IO port in a graphics processing unit, such as IO port 323 of FIG. 3. At block 515, process 500 may collect all dependency conditions identified. In one embodiment, a currently retrieved 2D graphics command may not have a command dependency condition on a previously retrieved 2D graphics command.

Referring back to FIG. 4, if there are dependency conditions, in one embodiment, process 400 may remove the dependency conditions or wait for an indicators indicating the dependency conditions have been satisfied at block 409. For a resource dependency condition, process 400 may send a request to a memory management module to make an associated graphics resource resident to satisfy the condition. A graphics resource may be resident if it is allocated in a physical memory coupled to a graphics processing unit. In one embodiment, a resident graphics resource is mapped to a virtual device space associated with a graphics processing unit. Process 400 may wait for an indictor indicating an associated graphics processing unit has completed processing graphics instructions for a dependent graphics command. In one embodiment, the indicator may be based on an interrupt message, such as a hardware interrupt, from a graphics processing unit to a host processor performing process 400. Process 400 may retrieve processing statuses from predetermined memory locations, such as specific registers, associated with a graphics processing unit to determine whether a capacity dependency condition is satisfied. In one embodiment, a graphic processing unit may indicate the status (e.g. usage) of a buffer within a graphics processing unit by, for example, raising a flag value in a register when an associated hardware 10 buffer, such as a hardware graphics command buffer for IO port 323 of FIG. 3, is full or almost full. The graphics processing unit may reset the flag value once hardware graphics commands received in the associated hardware 10 buffer have been executed. In one embodiment, process 400 may be notified when a capacity condition is satisfied. In another embodiment, process 400 may continue to check (e.g. polling) an indicator, such as a register flag value, to determine if a capacity condition has been satisfied.

At block 411, when the determined dependency conditions are satisfied or removed, process 400 may proceed to send hardware graphics commands based on a currently retrieved graphics command to an associated graphics processing unit. In one embodiment, process 400 may send a notification message to another graphics driver according to a header data extracted from a currently retrieved graphics command. Process 400 may retrieve next graphics command from a graphics command buffer at block 413 and continue at block 403 to process the next graphics command. In one embodiment, a stream of 2D graphics commands may be continuously retrieved from a command buffer to be forwarded to a graphics processing unit subject to the capacity of a graphics processing unit if associated graphics resources are resident.

Batch Processing Graphics Operations

In one embodiment, a single notification such as an interrupt may be generated for a batch of multiple graphics commands to reduce an expensive processing overhead requiring one interrupt per graphics command. Tracking which graphics commands have been submitted to determine when these graphics commands are completed may provide information to guide memory management system to free graphics resource no longer in use. Additionally, whether a graphics processing unit is idle may be determined to track which graphics resources can be freed or released when they are no longer in use.

Figure 6:
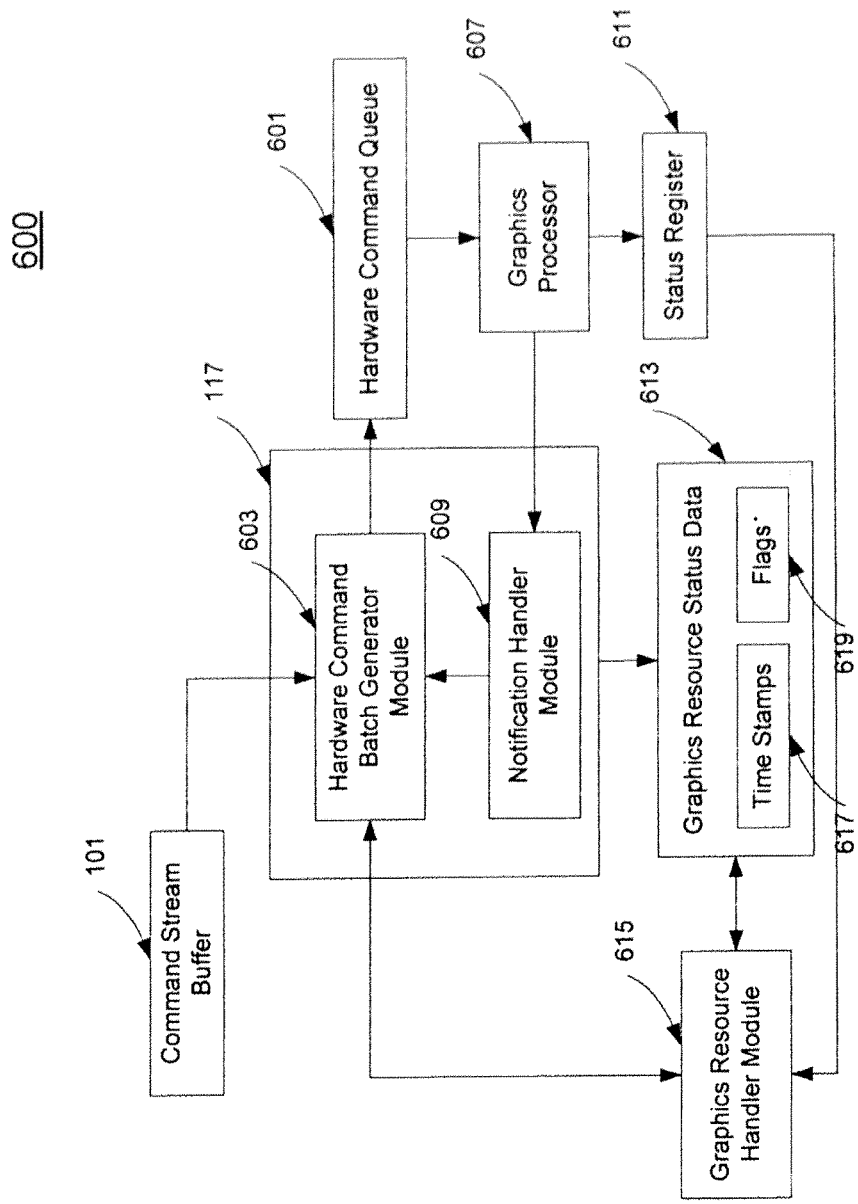
FIG. 6 is a block diagram illustrating one embodiment of a system that processes a batch of graphics commands.

FIG. 6 is a block diagram illustrating one embodiment of a system that processes a batch of graphics commands with a single notification. System 600 may be a part of system 100 of FIG. 1B. In one embodiment, a graphics driver module 117 may include a hardware command batch generator module 603 which prepares a batch of hardware graphics commands according to graphics commands retrieved from a command stream buffer 101. The batch generator 603 may send a batch of hardware graphics commands together in a single transaction to a graphics processing unit, such as graphics processing unit 119 of FIG. 1B. A batch of hardware graphics commands may include graphics processing instructions embedded in graphics commands retrieved from the command stream buffer 101.

A hardware command queue 601 may be coupled to a graphics processor 607 in a graphics processing unit, such as graphics processing unit 119 of FIG. 1B. A hardware command queue may be associated with an IO port of a graphics processing unit, such as IO port 323 of FIG. 3. A graphics processor 607 may send a notification message to a notification handler module 609 of a graphics driver module 117. In one embodiment, a notification message may be generated via an interrupt such as a hardware interrupt from the graphics processor 607 to a host processor hosting the graphics driver module 117. A physical memory may be coupled to a graphics processor 607 and a host processor. In one embodiment, a physical memory includes a status register 611 storing values indicating operating statuses of a graphics processing unit associated with the graphics processor 607. Operating statuses may include whether a graphics processing unit is busy or idle.

In one embodiment, a graphics resource status data 613 may provide a store for status information about a graphics resource, such as time stamps 617 and flags 619. Time stamps 617 may store values indicating whether a corresponding graphics resource is currently being operated on. Flags 619 may indicate if there are outstanding requests made against a corresponding graphics resource, such as a request to delete from a process initiated by a user. A graphics resource status data 613 may be updated by a graphics driver module 117. In one embodiment, time stamps 617 of a graphics resource may be updated by a graphics driver module 117 when submitting hardware graphics commands for a corresponding graphics command associated with the graphics resource. In other embodiments, time stamps 617 of a graphics resource may be updated by a graphics driver module 117 when a graphics processor 607 has completed processing graphics instructions corresponding to the graphics command associated with a graphics resource. A graphics resource handler module 615 may manage graphics resources, such as allocating, mapping and deleting corresponding memory space. In one embodiment, a graphics driver module 117 may update a graphics resource status data 613 via a graphics resource handler module 615.

Figure 7:
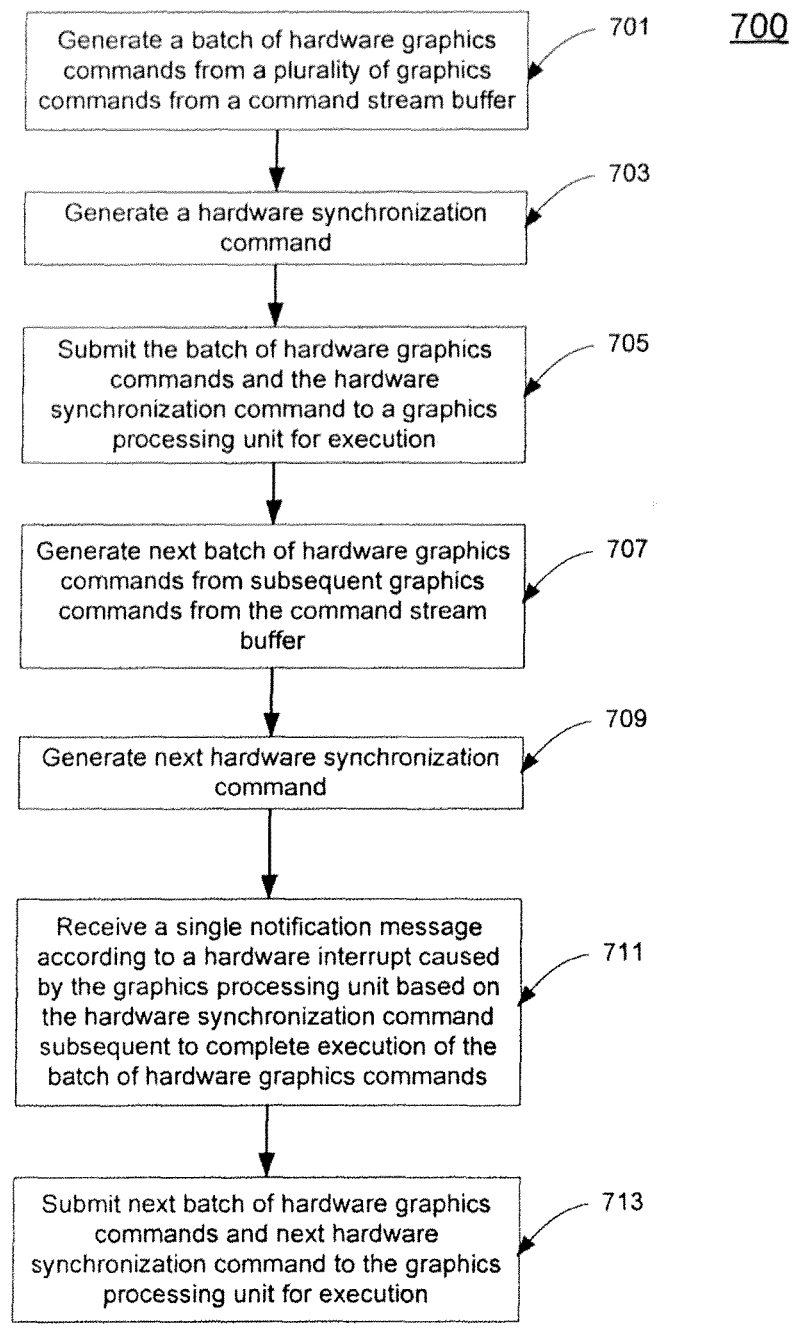
FIG. 7 is a flow diagram illustrating one embodiment of a process to batch graphic commands.

FIG. 7 is a flow diagram illustrating one embodiment of a process to batch graphic commands with a single interrupt notification. Process 700 may be performed in accordance with the system of FIG. 6. At block 701, in one embodiment, process 700 may generate a batch of hardware graphics commands from a plurality of graphics commands retrieved from a command stream buffer, such as command stream buffer 101 of FIG. 6. The graphics commands may be stored in a command stream buffer based on graphics API calls from applications. A graphics command may correspond to one or more hardware graphics commands to be sent to a graphics processor for execution, such as graphics processor 607 of FIG. 6. A batch of hardware graphics commands may be generated from a plurality of consecutive graphics commands. Process 700 may determine a batch of hardware graphics commands to be executed or processed in order by a graphics processing unit without waiting for other hardware graphics commands. In one embodiment, process 700 may generate a batch of hardware graphics commands corresponding to one or more 2D graphics commands. At block 703, process 700 may generate a hardware synchronization command corresponding to a batch of hardware graphics commands. When executed by a graphics processing unit, a hardware synchronization command may cause a graphics processing unit to interrupt a host processor, where process 700 is performed, to send a notification message.

In another embodiment, process 700 may generate a hardware synchronization command when a hardware command queue is full, such as hardware command queue 601 of FIG. 6, associated with a graphics processing unit. Process 700 may determine whether a hardware command queue is full via a status register associated with a graphics process unit, such as status register 611 of FIG. 6. In one embodiment, a batch of hardware graphics commands may be determined based on when a hardware command queue is full.

At block 705, according to one embodiment, process 700 may submit a batch of hardware graphics commands followed by a hardware synchronization command to a graphics processing unit for execution or processing. In one embodiment, process 700 may submit a batch of hardware graphics commands together with the hardware synchronization command to a graphics processing unit in one single transaction. At block 707, in one embodiment, process 700 may proceed to generate a next batch of hardware graphic commands from subsequent graphics commands in a command stream buffer, such as the command stream buffer at block 701. At block 709, process 700 may generate a next hardware synchronization command for the next batch of hardware graphics commands.

In one embodiment, at block 711, process 700 may receive a single notification message subsequent to complete execution of a batch of hardware graphics commands in a graphics processing unit. In another embodiment, process 700 may receive a single notification message when a hardware command queue associated with a graphics processing unit is emptied. A notification message may be generated based on a hardware interrupt caused by a graphics processing unit when finishing executing the batch of graphics commands. In one embodiment, a graphics processing unit may execute a hardware synchronization command to perform a hardware interrupt to a host processor for sending a notification message. Process 700 may be performed in a host processor. At block 713, process 713 may determine the next batch of hardware graphics commands are ready to be submitted to a graphics processing unit based on a received notification message. In one embodiment, the received notification message may signify that a graphics processing unit is idle after finishing executing pending hardware graphics commands. Process 700 may submit a next batch of hardware graphics commands and a next generated hardware synchronization command to the graphics processing unit for execution at block 713.

Figure 8:
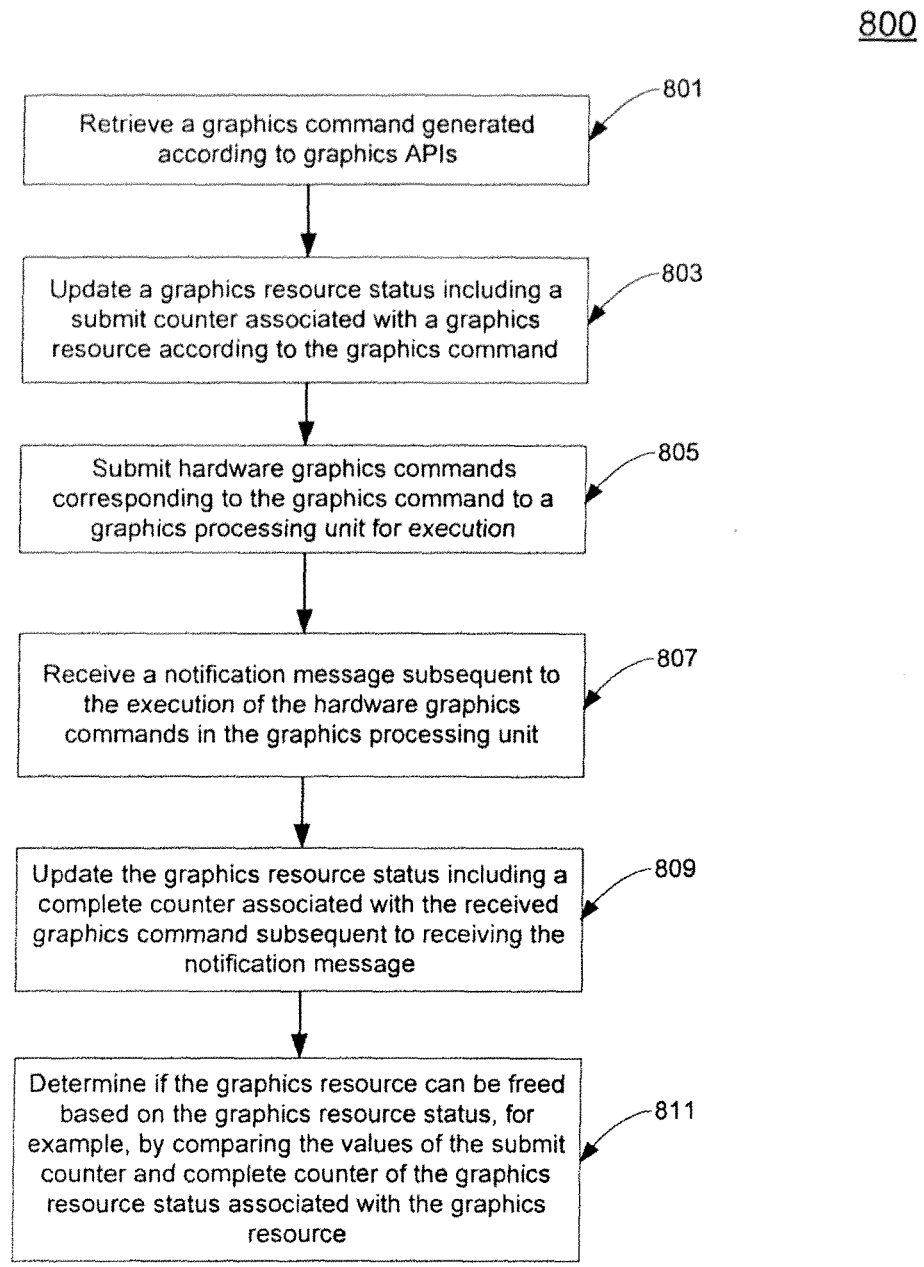
FIG. 8 is a flow diagram illustrating one embodiment of a process to maintain a graphics resource status associated with a graphics resource.

FIG. 8 is a flow diagram illustrating one embodiment of a process to maintain a graphics resource status associated with a graphics resource. Process 800 may be performed in accordance with the system of FIG. 6. At block 801, process 800 may retrieve a graphics command generated by API calls from graphics applications. In one embodiment, process 800 may retrieve the graphics command from the head of a command stream buffer, such as command stream buffer 101 of FIG. 6. A graphics command may be associated with a graphics resource. At block 803, process 800 may update a graphics resource status associated with a graphics resource. In one embodiment, a graphics resource status may be maintained via a submit counter and a complete counter. For example, a submit counter is used to maintain a number of graphics commands that have been sent to the hardware, while a complete counter is used to maintain a number of graphics commands that have been sent to the hardware and have been executed. In one embodiment, process 800 may update the submit counter by incrementing its value by one whenever a graphics command is received from a graphics API or alternatively, when a graphics command has been sent to the hardware. Subsequently, at block 805, process 800 may submit hardware graphics commands corresponding to the retrieved graphics command to a graphic processing unit, such as processing unit 119 of FIG. 1B, for execution.

At block 807, in one embodiment, process 800 may receive a notification message after the hardware graphics commands corresponding to a retrieved graphics command have been executed in a graphics processing unit. Process 800 may determine an association between a notification message and a retrieved graphics command. In one embodiment, process 800 may track submitted graphics command to determine the association. At block 809, process 800 may update a graphics resource status associated with a graphics resource subsequent to receiving a notification message. In one embodiment, process 800 may increment the value of a complete counter in a graphics resource status by one at block 809. At block 811, process 800 may determine if a graphic resource can be freed or released based on an associated graphics resource status. In one embodiment, process 800 may compare the values of a submit counter and a complete counter included in a graphics resource status to determine whether all graphics commands sent to the hardware have been executed or completed. Process 800 may determine an associated graphics resource can be released when the values of the submit counter and the complete counter are equal in the associated graphics resource status. When the values of the submit counter and complete counter are equal, that means all of the commands that have been sent to the hardware have been executed by the hardware. As a result, all graphics resources associated with those commands are no longer in use and these graphics resources can be released for use by other subsequent commands.

Figure 9:
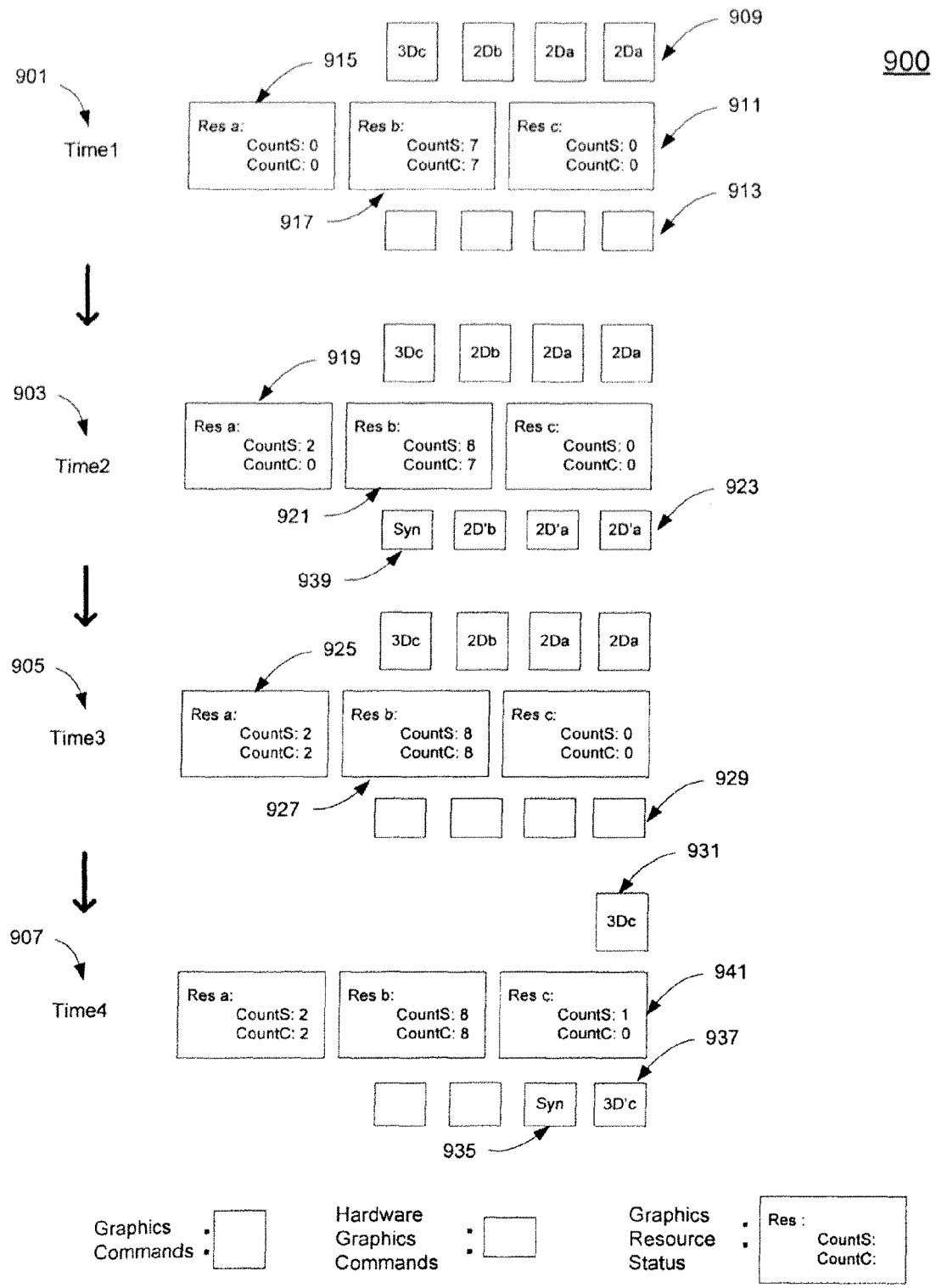
FIG. 9 is a sequence diagram illustrating an example of a process to batch graphic command streams based on associated graphics resource.

FIG. 9 is a sequence diagram illustrating an example of a process to batch graphic command streams based on associated graphics resource. Sequence 900 may be implemented based on the system of FIG. 6. In one embodiment, at time instance Time1 901, a command stream buffer stores four graphics commands 909 including a 3D graphics command 3Dc associated with graphics resource a 911, a 2D graphics command 2Db associated with graphics resource b 917 and two 2D graphics commands 2Da associated with graphics resource a 915. The four graphics commands 909 may be stored in an order tailed by the 3Dc command. Each graph resource status may include two time stamps, CountS as a submit counter and CountC as a complete counter. At time instance Time1 901, both the submit counter and the complete counter associated with graphics resource b have a value of 7. In one embodiment, at time instance Time1 901, hardware graphics commands corresponding to seven graphics commands associated with graphics resource b 917 have been sent to graphics processing units, as indicated by the CountS value. In another embodiment, at time instance Time1 901, receiving graphics processing units have finished executing the hardware graphics commands corresponding to seven graphics commands associated with graphics resource b 917, as indicated by the CountC value. At time instance Time1 901, a hardware command buffer 913 in a graphics processing unit may have empty slots ready to receive hardware graphics commands.

At time instance Time2 903, a batch of hardware graphics commands are submitted to the hardware command buffer including 2D'b, 2D'a and 2D'a 923 corresponding to a stream of 2D graphics commands 2Db, 2Da and 2Da 909 from the command buffer. Additionally, a hardware synchronization command Syn 939 is submitted to the hardware command buffer following the last hardware graphics command 2D'b in the batch. The graphics resource status for graphics resource a 919 associated with two graphics commands 2Das' is updated by incrementing its submit count CountS by 2 to be of a value 2 according to the submission. The graphics resource status for graphics resource b 921 associated with one graphics command 2Db is updated by incrementing its submit count CountS by 1 to be of a value 8 according to the submission.

At time instance Time3 905, the graphics processing unit have executed the batch of hardware graphics commands and the hardware synchronization command 923 from the hardware command buffer. Executing the hardware synchronization command Syn 939 has resulted in a notification message signifying a completion of processing the stream of 2D graphics commands 2Db, 2Da and 2Da for updating associated graphics resource statuses. In one embodiment, the graphics resource status for graphics resource a 925 associated with two graphics commands 2Das' is updated by incrementing its complete count CountC by 2 to be of a value 2 according to the notification. The graphics resource status for graphics resource b 927 associated with one graphics command 2Db is updated by incrementing its complete count CountC by 1 to be of a value 8 according to the notification.

At time instance Time4 907, a next batch of hardware graphics command is submitted to the hardware command buffer including a single hardware graphic command 3D'c 937 corresponding to one 3D graphics command 3Dc 931 from the command buffer. Additionally, a newly generated hardware synchronization command Syn 935 is submitted to the hardware command buffer following hardware graphics command 3D'c. The graphics resource status for graphics resource c 941 associated with the graphics command 3Dc is updated by incrementing its submit count CountS by 1 to be of a value 1 according to the submission.

As described above, referring back to FIG. 6, when a stream of graphics commands is received and stored in the command stream buffer 101, graphics driver 117 may stamp each graphics command received at the command stream buffer 101, for example, by incrementing a submit counter to represent a number of graphics commands that have been received. Alternatively, the submit counter is updated when the graphics commands have been enqued for submission to the graphics processing unit. In addition, the graphics driver 117 may further maintain graphics resources usage required by these graphics commands using graphics resource handler module 615.

Once the graphics commands have been sent to the hardware, graphics driver 117 still maintains the command stream buffer 101 that stores the graphics commands that have been sent to the hardware and stamped by the graphics driver 17. Subsequently, a notification is received by the graphics driver from the hardware, for example, via an interrupt via a host processor, indicating that the hardware has completed executing the graphics commands. In response to the notification, the graphics driver may update the complete counter to indicate the number of graphics commands that have been executed. In addition, the graphics driver revisits the graphics commands stored in the command stream buffer 101, where these graphics commands by now have been executed by the hardware. For each of those graphics commands that have been executed, the graphics resources associated with those commands may be released using the information maintained by graphics resource handler module 615. In this way, the graphics resources would not be released until the associated graphics commands have been processed. This is typically useful when an application or a graphics API requests for releasing certain graphics resources while the associated graphics commands are still being processed by the hardware, which will be described in details further below.

Asynchronous Notifications for Concurrent Graphics Processing

In one embodiment, requests to swap graphics data to one or more display devices may be constructed to ensure segments of graphics data are ready for display prior to swapping the graphics data. Each segment of graphics data may be rendered by separate media processors running substantially concurrently and/or asynchronously. A synchronization point may be provided to ensure all segments of the graphics data are displayed simultaneously in a graphics display (e.g. refresh). Content completion notifications that arrive asynchronously to a swap request may allow maximum parallelism among media processors and/or display devices which operate asynchronously in parallel for display the graphics data.

Figure 10:
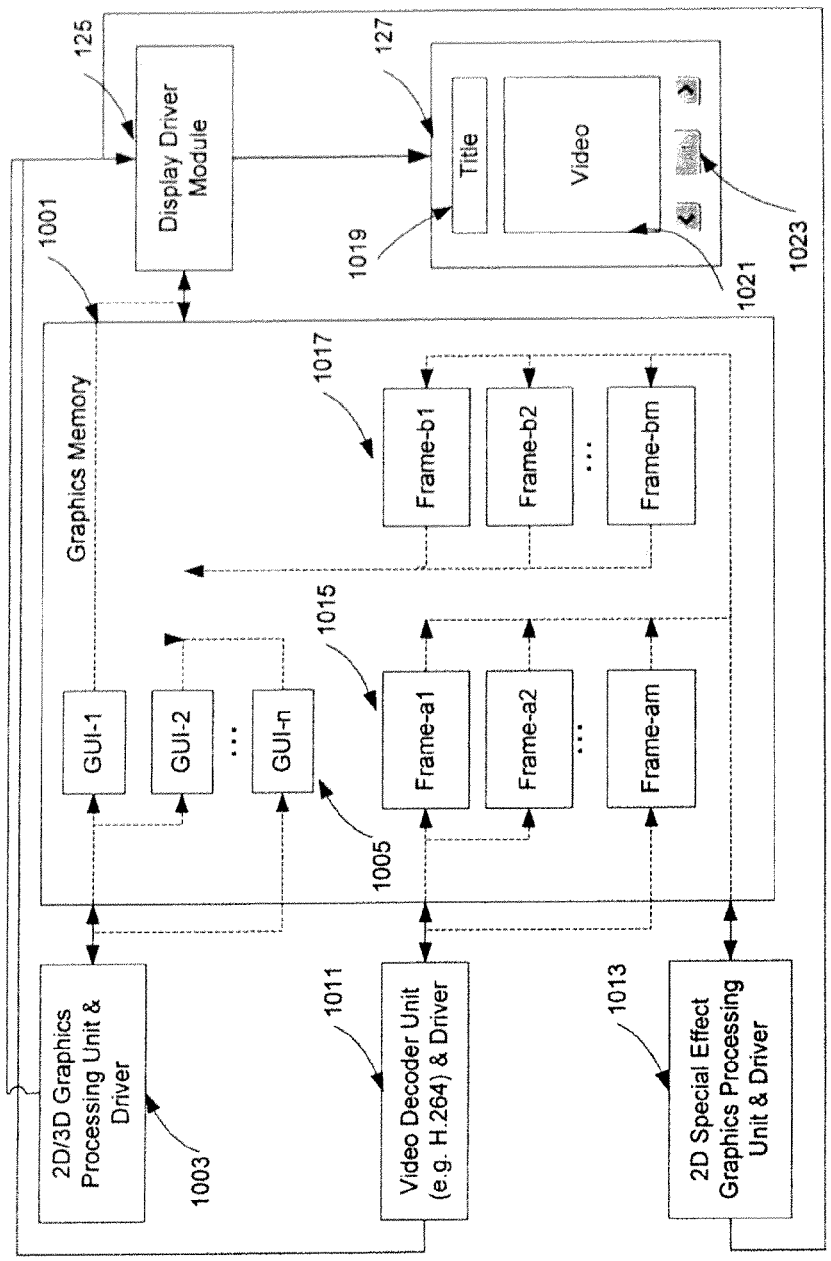
FIG. 10 is a block diagram illustrating one embodiment of a system for asynchronous notifications among multiple graphics processing units to synchronize displaying graphics data.

FIG. 10 is a block diagram illustrating one embodiment of a system for asynchronous notifications among concurrent graphics processing units to synchronize displaying a graphics data. In one embodiment, system 1000 may be part of system 100 of FIG. 1B to support graphics applications. Referring to FIG. 10, system 1000 may include multiple graphics processing units such as a graphics processing unit for 2D/3D graphics and associated driver 1003, such as graphics driver module 117 and graphics processing unit 119 of FIG. 3. A video decoder unit and associated driver 1011 in system 1000 may provide standard based digital video decoding capability, such as H.264 standard. In one embodiment, system 1000 may include graphics processing units for 2D special effects and associated drivers 1013. A graphics processing unit may perform graphics operations such as rotation, flipping, or resizing etc. for 2D special effects. System 1000 may include a graphics memory coupled with 2D/3D graphics processing unit 1003, video decoder unit 1011 and 2D special effect graphics processing unit 1013. The 2D/3D graphics process unit may draw a plurality of GUI (graphical user interface) components 1005 allocated in the graphics memory 1001. A video decoder unit may decode incoming digital video signals into multiple memory frames 1015 in a graphics memory 1001. In one embodiment, a 2D special effect graphics processing unit 1013 may perform special graphics operations on memory frames 1015 based on decoded video signals into corresponding memory frames 1017 in a graphics memory 1001. System 1000 may include a display driver module 125 associated with a display device 127 as in FIG. 1B. A display driver module 125 may be coupled with a graphics memory 1001, a 2D/3D graphics processing unit 1003, a video decoder unit 1011 and a 2D special effect graphics processing unit 1013 to display graphics data from a graphics memory 1001. In one embodiment, a display device 127 may display graphics data including user interface components 1019, 1023 and digital video in a video frame 1021 retrieved from a graphics memory 1001. A display device 127 may display a graphics frame including multiple graphics segments, such as, for example, user interface components 1019, 1023 and video frame 1021.

As described above, a video frame may include multiple components which may require different graphics resources and processed by different graphics rendering engines or processing units. In one embodiment, each component may be processed by a different graphics processing unit. Thus, multiple graphics processing units may process multiple components of a video frame substantially concurrently and asynchronously. The output of the graphics processing units are stored in graphics memory 1001. However, the processing speeds of different graphics processing units may be different dependent upon the specific graphics commands and/or graphics resources. As a result, the output data generated from different graphics processing units may arrive at the graphics memory 1001 at different time. According to one embodiment of the invention, a synchronization signal, such as a swap ID, is transmitted to the display controller 125 to allow the display controller 125 to collect all of the output data of all components of a video frame, based on the synchronization signal such as a swap ID, from all graphics processing units before display the video frame having all of the components ready in a display. In this embodiment, a swap ID is used to identify a particular video frame and each graphics components of the video frame include certain information linked with the swap ID. When display controller 125 is notified by each of the graphics processing units indicating that a respective component of the video frame identified by the swap ID has been completed, the display controller 125 can examine each component based on the swap ID to determine whether all components are ready to be displayed. If so, the video frame is displayed by the display controller 125; otherwise, the display controller 125 may wait until all of the components of the video frame have been completed.

Figure 11:
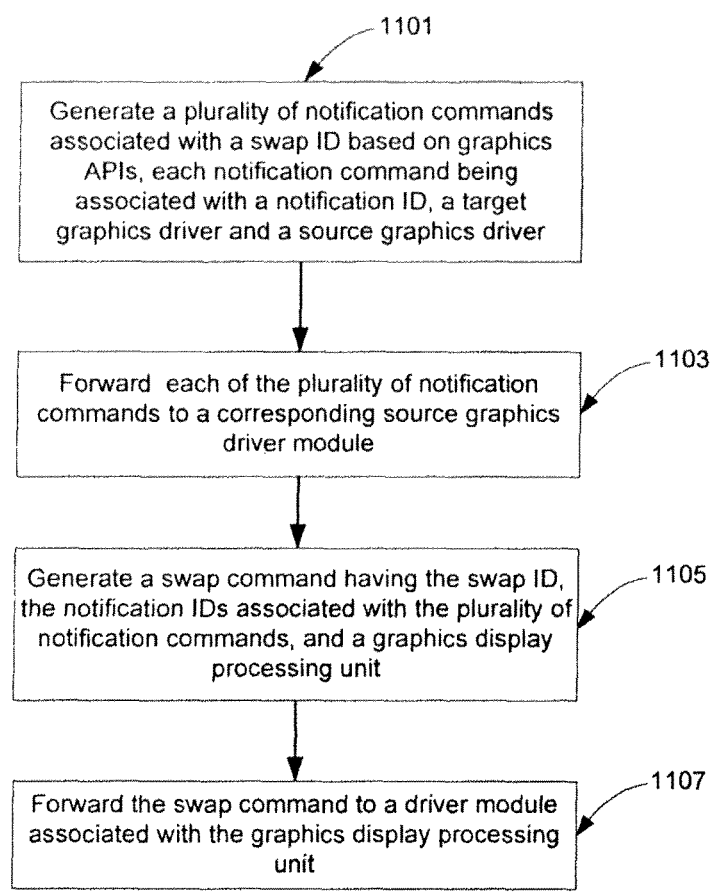
FIG. 11 is a flow diagram illustrating one embodiment of a process to generate graphic commands for asynchronous notifications.

FIG. 11 is a flow diagram illustrating one embodiment of a process to generate graphic commands for asynchronous notifications. Process 1100 may be performed in accordance with the system of FIG. 10. In one embodiment, process 1100 may generate a plurality of notification commands according to API calls from graphics applications, such as graphics application 107 of FIG. 1B, at block 1100. The plurality of notification commands may be associated with each other through an identifier, such as, for example, a swap ID, for identifying a specific frame (e.g., a video frame) or a group of related graphics components. A notification command may include a notification ID. In one embodiment, a notification command may be associated with a target graphics driver module, such as display driver module 125, and a source graphics driver module, such as the graphics driver module in the 2D/3D graphics processing unit and driver 1003. A notification command may be stored in a command buffer associated with a corresponding source graphics driver module, such as command stream buffer 101 of FIG. 1B. In one embodiment, a source graphics driver module associated with a notification command to send a driver notification message to a target graphic driver module associated with the notification command. At block 1103, process 1100 may forward each of the plurality of notification commands to a corresponding source graphics driver module. In one embodiment, process 1100 may store a notification command in a command stream buffer, such as command stream buffer 101 of FIG. 1B, for a source graphics driver associated with the notification command.

At block 1105, process 1100 may generate a swap command via a swap API call to display a graphics data in a display device. The swap command may include a swap ID and one or more notification IDs' in association with one or more notification commands at block 1101. In one embodiment, a swap command may be associated with a graphics display unit, such as the display device 127 of FIG. 10. Process 1100 may forward a generated swap command to a display driver module, such as the display driver module 125 of FIG. 10, according to an associated graphics display unit at block 1107.

Figure 12:
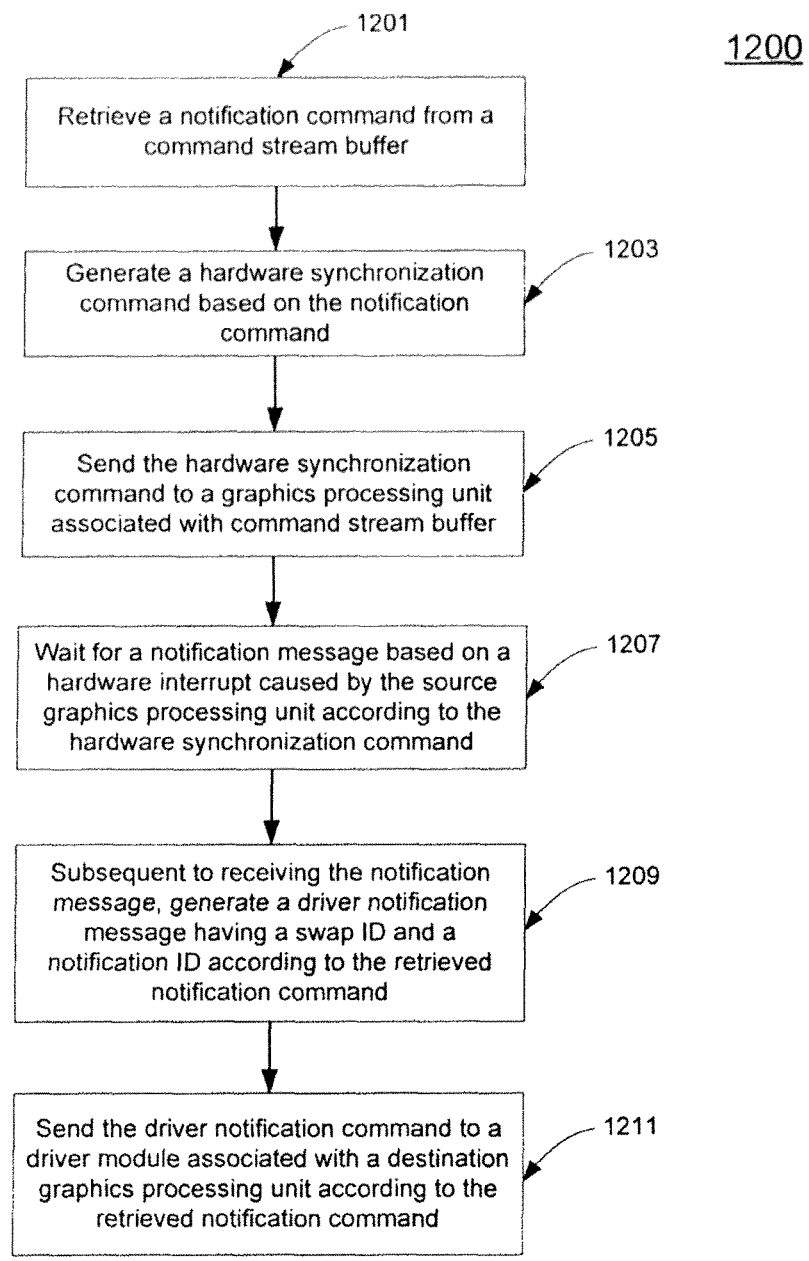
FIG. 12 is a flow diagram illustrating one embodiment of a process to generate asynchronous notifications among multiple graphics processing units.

FIG. 12 is a flow diagram illustrating one embodiment of a process to generate asynchronous notifications among graphics processing units. Process 1200 may be performed at a graphic driver module, such as the graphics driver module in the 2D/3D graphics processing unit and driver 1003 of FIG. 10. At block 1201, in one embodiment, process 1200 may retrieve a notification command from a command stream buffer associated with a graphics processing unit, such as the 2D/3D graphics processing unit 1003 of FIG. 10. Process 1200 may generate a hardware synchronization command, such as hardware synchronization command syn 939 of FIG. 9, for a graphics processing unit at block 1203. In one embodiment, a batch of hardware graphics processing commands may be determined based on a notification command according to process 700 at block 701 of FIG. 7. In other embodiments, a hardware synchronization command generated according to process 1200 at block 1203 may be the same as the hardware synchronization command generated according to process 700 at block 703 of FIG. 7. At block 1205, process 1200 may send a hardware synchronization command to a graphics processing unit associated with a command stream buffer where the notification command is retrieved from. In one embodiment, the graphics processing unit to receive the hardware synchronization command is a source graphics processing unit associated with the notification command.

At block 1207, according to one embodiment, process 1200 may wait for a notification message caused by a graphics processing unit executing a hardware synchronization command. In one embodiment, a notification message may be caused by a hardware interrupt according to a hardware synchronization command. Subsequently, at block 1209, process 1200 may generate a driver notification message including a swap ID and a notification ID associated with a notification command. In one embodiment, a notification command may be associated with a target graphics driver, such as display driver module 125 of FIG. 10. Process 1200 may send a driver notification message to a target graphics driver associated with the notification at block 1211.

Figure 13:
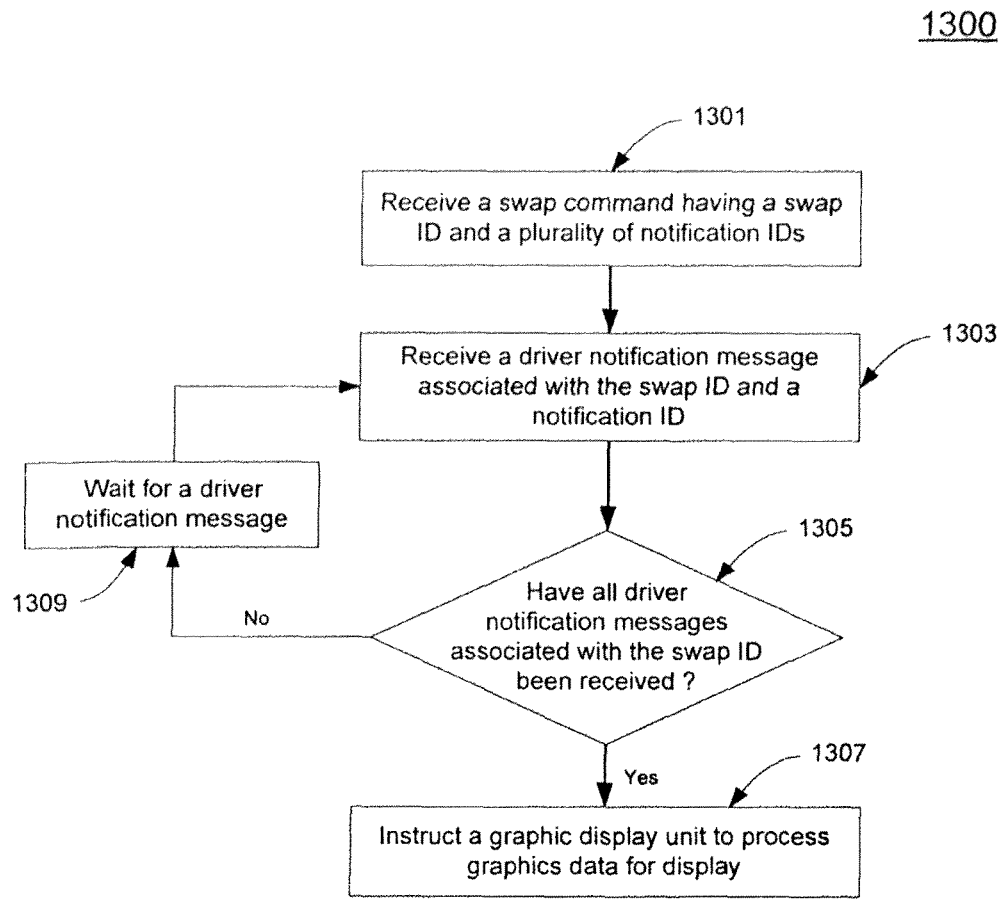
FIG. 13 is a flow diagram illustrating one embodiment of a process to synchronize displaying a graphics data based on asynchronous notifications.

FIG. 13 is a flow diagram illustrating one embodiment of a process to synchronize displaying a graphic data based on asynchronous notifications. Process 1300 may be performed in accordance with the system of FIG. 10. In one embodiment, process 1300 may be performed at a graphics driver for a display device, such as display driver module 125 of FIG. 10. At block 1301, process 1300 may receive a swap command having a swap ID and a plurality of notification IDs. A swap command may be generated according to API calls from graphics applications, such as graphics application 107 of FIG. 1B. Process 1303 may receive a driver notification message at block 1303, such as the driver notification message generated according to process 1200 at block 1209 of FIG. 12. The driver notification message may include the swap ID and a notification ID. In one embodiment, a notification ID may be one of the plurality of notification IDs included in a swap command having the swap ID. At block 1305, process 1300 may determine if each of the plurality of notification IDs associated with a swap ID has a corresponding driver notification message received based on the notification ID included in the received notification message at block 1303. If not, process 1300 may continue waiting for additional driver notification messages to arrive at block 1309. Otherwise, process 1300 may proceed to instruct an associated graphics display unit, such as display device 127 of FIG. 10, to display a graphic data at block 1307. In one embodiment, a plurality of display devices may display one or more graphics data at the same time based on separate notification commands from a single graphics application.

Figure 14:
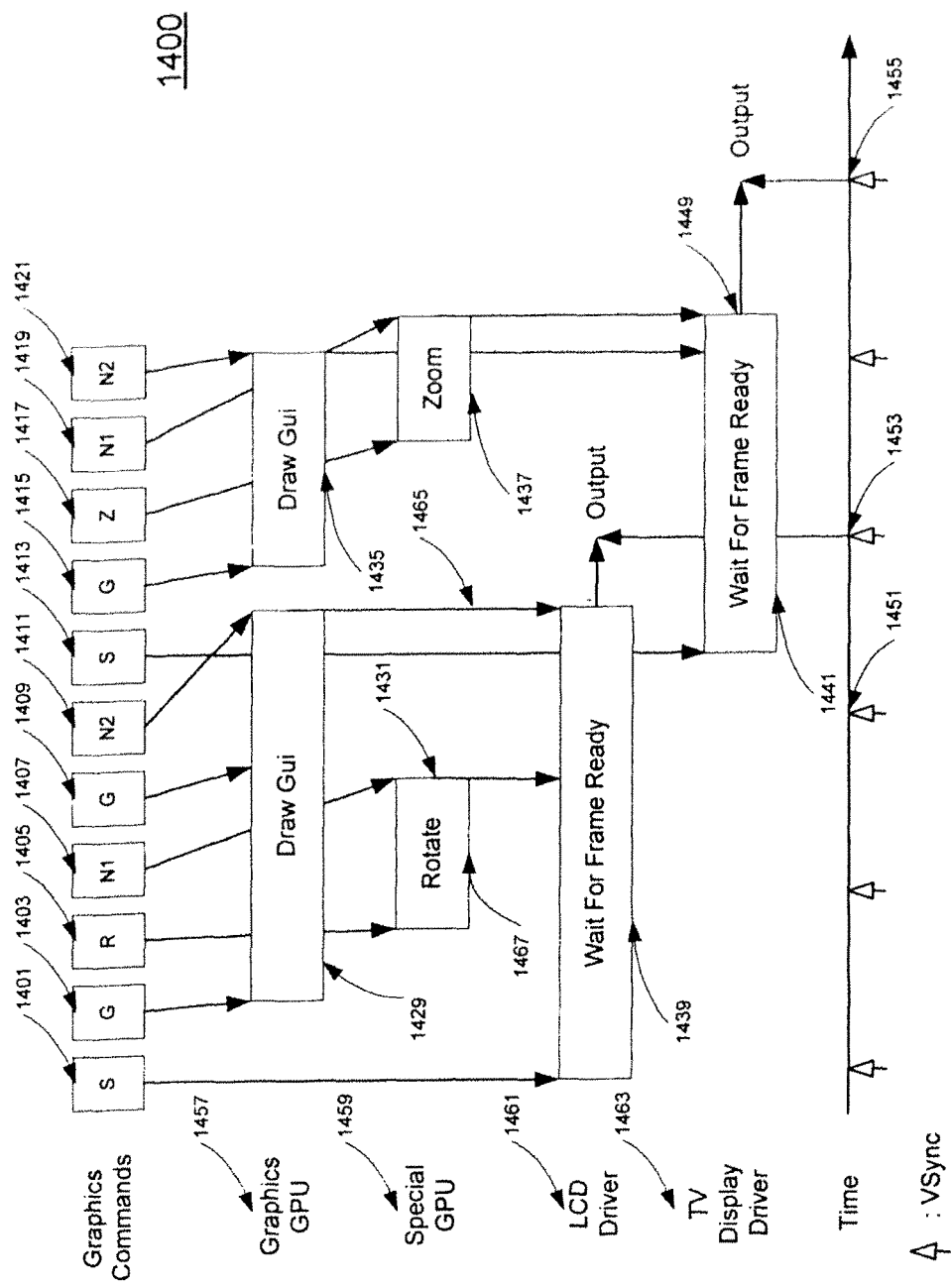
FIG. 14 is a timing diagram illustrating one example to synchronize displaying a graphics data according to asynchronous notifications among multiple graphics processing units.

FIG. 14 is a timing diagram illustrating an example to synchronize displaying graphics data according to asynchronous notifications among concurrently graphics processing units. In one embodiment, timing diagram 1400 may be based on the system of FIG. 10. Graphics commands S 1401, G 1403 to N2 1427 may be generated sequentially according to API calls from a graphics application, such as graphics application 107 of FIG. 1B. Graphics command S 1401 may be a swap command associated with a display driver, such as LCD driver 1461. Swap command S 1401 may be associated with at least two notification IDs. In one embodiment, LCD driver 1461 may receive swap command S 1401 to wait for at least two driver notification messages associated with the notification IDs included in the swap command S 1401 during time period 1439.

Graphics commands G 1403, G 1409 and notification command N2 1411 may be sent to the driver for a graphics processing unit, graphics gpu 1457, to draw GUI graphics data during time period 1429. Graphics gpu 1457 may be the 2D/3D graphics processing unit 1003 of FIG. 10. Graphics command R 1405 and notification command N1 1407 may be sent to the driver for a graphics processing unit, special GPU 1459, to perform rotation operation on a video frame during time period 1467. In one embodiment, special GPU 1459 may be a 2D special effect graphics processing unit 1013 of FIG. 10.

Notification commands N1 1407 and N2 1411 may be associated with two of the notification IDs associated with swap command S 1401. In one embodiment, the driver for special GPU 1459 may send a driver notification messages corresponding to notification commands N1 1407 subsequent to completing the rotation operation 1431. The driver for graphics GPU 1457 may send a driver notification message corresponding to notification command N2 1411 subsequent to completing drawing GUI graphics data according to graphics commands G 1403 and G 1409 at 1465. In one embodiment, LCD driver 1461 may determine a graphics data, e.g. in a frame buffer, is ready to display at 1465 because each notification ID associated with the swap ID for swap command S 1401 has a corresponding driver notification message received. The graphics data may include the GUI components drawn during time period 1429 and a video frame rated during time period 1467. When receiving video synchronization signal Vsync at time instance 1453, LCD driver 1461 may display the corresponding graphics data. In one embodiment, LCD driver 1461 may not display a graphics data corresponding to the swap ID of swap command S 1401 when receiving Vsync signal at time instance 1451 because the driver notification command associated with notification command N2 1411 has not been received.

In one embodiment, graphics command S 1413 may be a swap command associated with a display driver, such as TV display driver 1463. Swap command S 1413 may be associated with at least two notification IDs. TV display driver 1463 may receive swap command S 1413 to wait for at least two driver notification messages associated with the notification IDs included in the swap command S 1413 during time period 1441. Graphics commands G 1415 and notification command N2 1421 may be sent to the driver for graphics GPU 1457 to draw GUI graphics data during time period 1435. Graphics command Z 1417 and notification command N1 1419 may be sent to a driver for special GPU 1459 to perform zooming operation on a video frame during time period 1437. Notification commands N1 1419 and N2 1421 may be associated with two of the notification IDs associated with swap command S 1413. In one embodiment, TV display driver 1463 may determine a graphics data is ready to display at 1449 after receiving both driver notification messages associated with notification IDs of notification commands N1 1419 and N2 1421. TV display driver 1463 may display a graphics data corresponding to swap command 1413 when receiving the next video synchronization signal Vsync at 1455 after 1449.

Graphics Resources Management

In one embodiment, asynchronous deletion operations may be performed based on detecting if graphics processing units are idle or not to allow a host processor to immediately return to take on additional tasks after making a deleting request. Graphics processing units may be ensured to be idle when graphics resources are deleted while allowing parallel operations between the graphics processing units and a coupled host processor.

Figure 15:
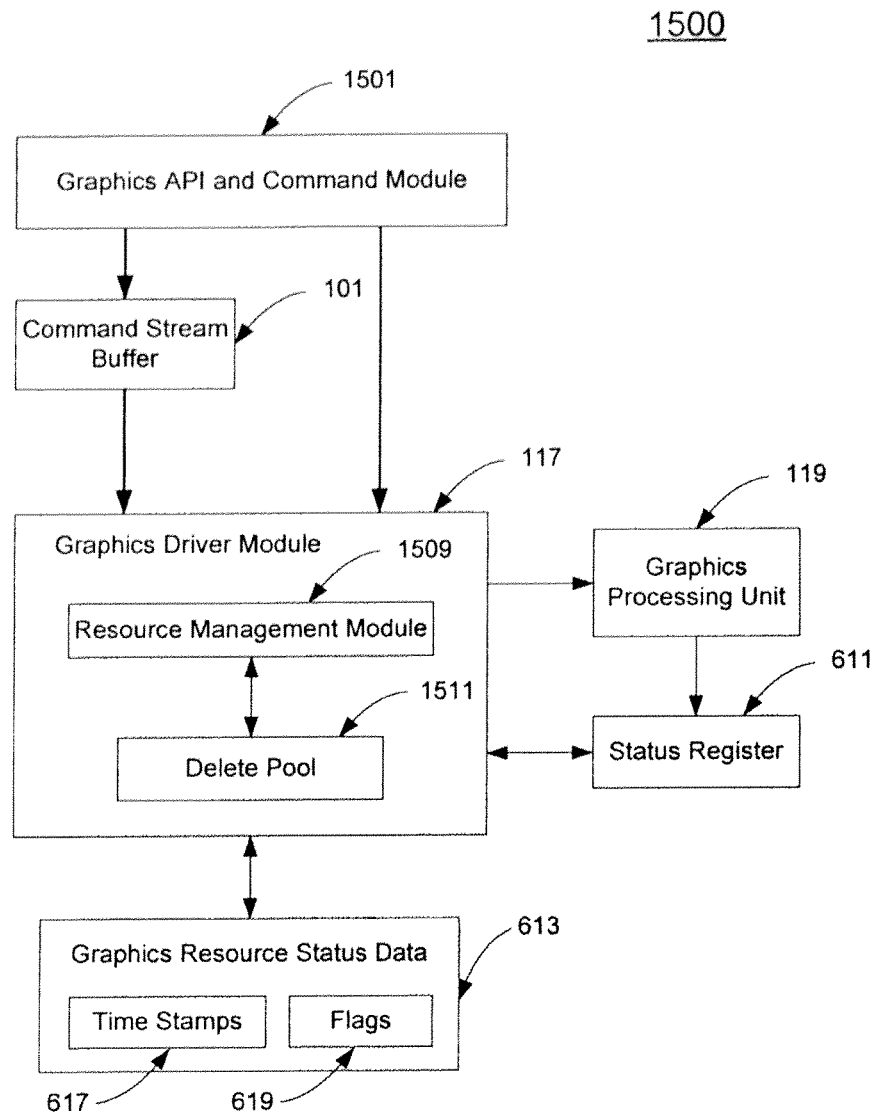
FIG. 15 is a block diagram illustrating one embodiment of a system to manage graphics resources for a GPU.

FIG. 15 is a block diagram illustrating one embodiment of a system to defer deleting a graphics resource on requests from graphics APIs. System 1500 may be part of system of 100 of FIG. 1B. In one embodiment, system 1500 may include a graphics API and command module 1501 for servicing API calls from application such as graphics application 107 of FIG. 1B. A graphics API and command module 1501 may include, for example, a graphics API module 105 and a 2D/3D command generator module 109 of FIG. 1B. A graphics API and command module may generate graphics commands to be stored in a command stream buffer 101 according to API calls from a graphics application. Alternatively, a graphics API and command module may send a management request (e.g. delete or release certain graphics resources, such as memory, etc.) to a graphics driver module 117 in response to API calls from a graphics application. In one embodiment, the graphics driver module 117 may be associated with a graphics processing unit 119 as in FIG. 1B. In other embodiments, a graphics driver module 117 may retrieve operating status data of a graphics processing unit 119 from a status register 611 as in FIG. 6.

A graphics driver module 117 may include a resource management module 1509 for managing graphics resources allocated according to graphics commands retrieved from a command stream buffer 101. A resource management module may notify a memory management module to allocate required graphics resourced associated with a graphics command. In one embodiment, a graphics resource may be associated with a graphics resource data 613 including time stamps 617 and flags 619, using certain techniques described above. Time stamps 617 for a graphics resource may include a complete counter and submit counter as in FIG. 7. Flags 619 may include a Delete flag and a Finish flag. Flags 619 may be set according to management requests received from the graphics API and command module 1501. In one embodiment, the graphics driver module 117 may include a delete pool 1511 coupled with the resource management module 1509. The delete pool 1511 may be a data structure identifying one or more pointers corresponding to one or more graphics resources to be released from allocated memories. In one embodiment, a delete pool 1511 may be updated by a resource management module 1509.

According to certain embodiments, the submit counter and complete counter may be used to identify which of the graphics commands have been sent to the hardware and which of the graphics commands have been completed by the hardware. The finish flag and delete flag may be used to indicate whether a specific graphics command has been completed and whether the graphics resources associated with the commands can be released or deleted. This typically useful when a request is received from an application or a graphics API registering a notification when certain graphics commands have been completed (e.g., finished) and/or requesting certain graphics resources can be released (e.g., delete).

For example, according to certain embodiments, when a request is received from an application or a graphics API for registering a notification call back when a specific graphics command has been completed, the graphics driver may check based on the finish flag of the requested command to determine whether the command has been completed. If the finish flag has been set which indicates that the associated command has been completed, the graphics driver may immediately return the request indicating that the command has been completed.

However, if the finish flag has not be set which indicates that the command has not been completed or finished by the hardware, the graphics driver may delay returning the request, for example, by marking the request as "pending". Subsequently, when the graphics driver receives a notification from the hardware indicating that the previous command or previous batch of commands have been completed, the graphics driver will "walk through", for example, in the command stream buffer, those commands that have been sent to the hardware and mark those commands as "finished" by setting the corresponding finish mark. Thereafter, a maintenance routine or a garbage collection routine maintained by the graphics driver may "clean up" the pending request for finish notifications by checking the finish flag of the commands and return the pending requests to indicate the caller (e.g., application or graphics API) that the requested command has been "finished."

In another scenarios, according to one embodiment, when an application or a graphics API sends down a request for deleting or releasing certain graphics resources, the graphics driver may check whether the requested resources can be deleted or released using the graphics resource status data. If there is no graphics command pending to be finished that is associated with the requested graphics resources, the requested resources can be immediately deleted or released. However, if there is at least one graphics command associated with the requested graphics resources and is still pending (e.g., the corresponding "finish" flag has not been set), the requested graphics resources cannot be deleted or released. In this situation, the graphics driver may delay returning the request by marking the request as "pending" and set the "delete" flag of the requesting graphics resources to indicate that the associated graphics resources have been requested to be deleted or released.

Subsequently, when the graphics driver receives a notification from the hardware indicating that a previous command or a previous batch of commands has been completed. The graphics driver marks those commands as "finished" by setting the corresponding "finished" flag. In addition, graphics driver may check whether there are any outstanding graphics resources that require to be cleaned up by examining the delete pool 1511. For each graphics resource that has been marked in a delete flag, if the associated graphics command or commands have been executed indicated via the corresponding finish flag, the marked graphics resources are deleted or released. Other configurations apparent to those with ordinary skills in the art may exist.

Figure 16:
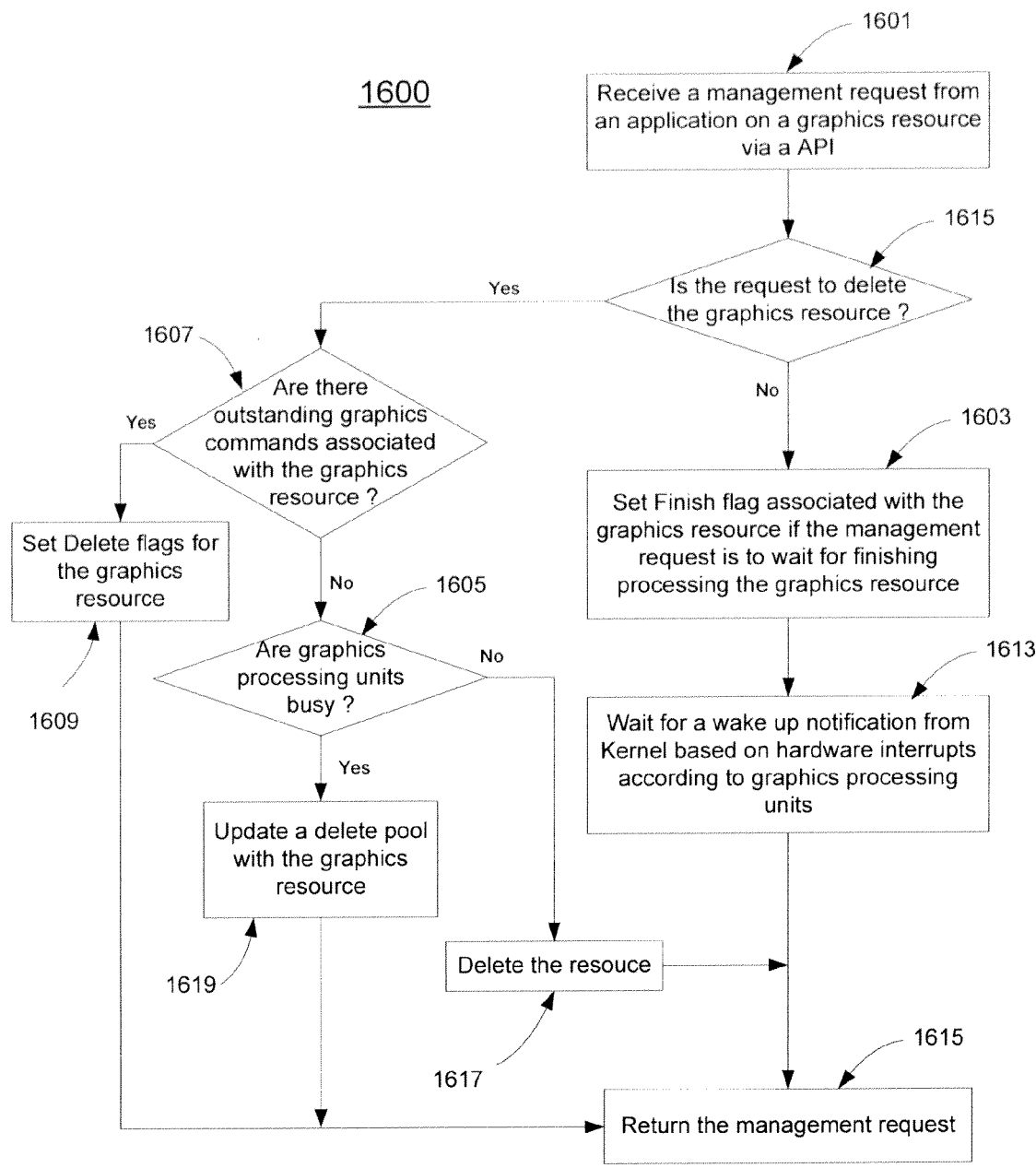
FIG. 16 is a flow diagram illustrating one embodiment of a process to manage graphics resources for a GPU.

FIG. 16 is a flow diagram illustrating one embodiment of a process to defer deleting a graphics resource on requests from graphics APIs. Process 1600 may be performed in accordance with the system of FIG. 15. In one embodiment, process 1600 may receive a management request on a graphics resource based on API calls from an application at block 1601. A graphics resource may be identified by a unique identifier included in the management request. At block 1615, process 1600 may determine if a received request is a Delete request to delete a graphics resource from a physical memory. For a Delete request, process 1600 may proceed at block 1607 to determine if there are outstanding graphics commands associated with a graphics resource to be deleted. A graphics command may be outstanding if it has been sent to a command stream buffer to be processed in an associated graphics processing unit. In one embodiment, process 1600 may compare values of a complete counter and a submit counter associated with a graphics resource to be deleted to determine if there are corresponding outstanding graphics commands. When the values of both the complete counter and the submit counter are equal, in one embodiment, process 1600 may determine there are outstanding graphics commands associated with the graphics resource. Otherwise, process 1600 may determine there are no outstanding graphics commands associated with the graphics resource.

At block 1605, in one embodiment, process 1600 may determine if there are graphics processing units busy processing graphics data after determining there are no associated outstanding graphics commands. In one embodiment, one or more graphics processing units may be coupled with a graphics memory storing the graphics resource to be deleted, such as the graphics memory 1001 of FIG. 10. Memory management operations on a graphics memory, such as memory mapping, allocation, releasing, etc., may not be performed when a coupled graphics processing unit is busy. For example, a physical memory that has been mapped as a virtual memory or a linear memory cannot be released or deleted (e.g., unmapped) while the hardware is accessing the memory; otherwise, the system may crash. In one embodiment, process 1600 may retrieve operating status from a status register 611 which indicates whether an associated graphics processing unit 119 is currently busy or not. Process 1600 may proceed to delete the graphics resource at block 1617 if no graphics processing units are busy. Otherwise, at block 1619, process 1600 may update a delete pool in a graphics driver module, such as delete pool 1511 of FIG. 15, to include the graphics resource for deletion by the updated delete pool. In one embodiment, process 1600 may add a pointer pointing to the graphics resource to the delete pool at block 1619. If process 1600 identifies outstanding graphics commands associated with the graphics resource at block 1607, in one embodiment, process 1600 may proceed at block 1609 to set a Delete flag associated with the graphics resource, such as in flags 619 of FIG. 15. A Delete flag, when set, may indicate a request has been made to delete a corresponding graphics resource. Subsequently, at block 1615, process 1600 may return from the management request to the calling application.

At block 1603, in one embodiment, process 1600 may set a Finish flag associated with a graphics resource associated with a management request received at block 1601, if the management request is to wait for finishing processing the graphics resource instead of deleting the graphic resource as determined at block 1615. A Finish flag, when set, may signify a request has been made for a process, such as process 1600, to be notified when all outstanding graphics commands associated with a graphics resource have been processed. In one embodiment, a Finish flag associated with a graphics resource may include an identification of a process waiting to be notified. At block 1613, process 1600 may wait for a wake up notification message when all outstanding graphics commands associated with a graphics resource have been processed. In one embodiment, the wake up notification message may be based on hardware interrupts generated from graphics processing units finishing processing outstanding graphics commands associated with the graphics resource. A graphics processing unit may notify a host processor which performs process 1600 when a hardware interrupt occurs. When waken up, process 1600 may return from the management request to the calling application at block 1615.

Figure 17:
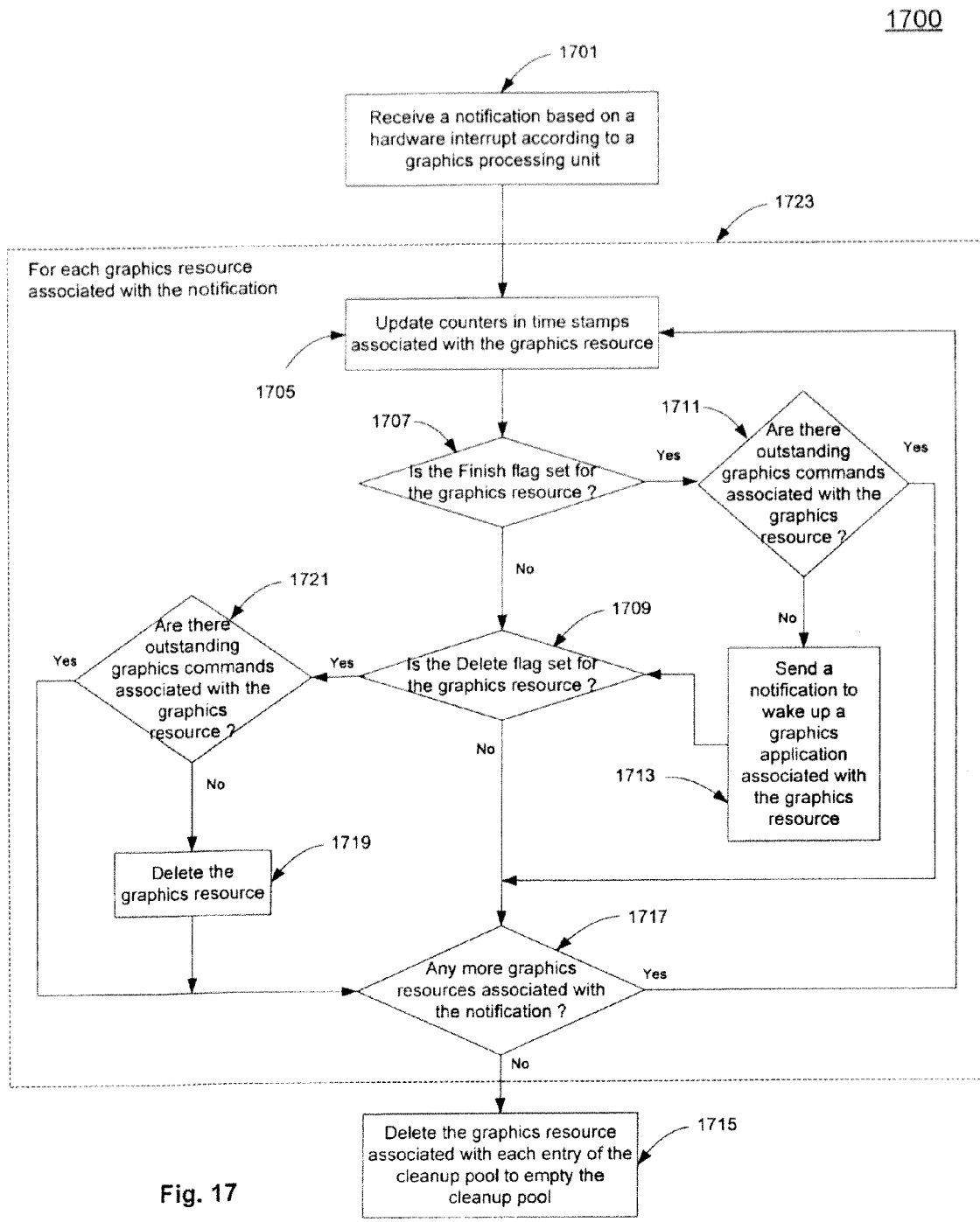
FIG. 17 is a flow diagram illustrating one embodiment of a process to manage graphics resources for a GPU.

FIG. 17 is a flow diagram illustrating one embodiment of a process to delete a graphics resource in accordance with the system of FIG. 15. Process 1700 may be performed in accordance with the system of FIG. 15. At block 1701, process 1700 may receive a notification message based on an interrupt (e.g., a hardware interrupt) according to a graphics processing unit. In one embodiment, the graphics processing unit may execute a hardware synchronization command, such as Syn 939 of FIG. 9, to cause a hardware interrupt. The notification message received at block 1701 may be associated with one or more graphics commands retrieved from a command stream buffer, such as graphics commands 2Db to 2Da 909 of FIG. 9. The notification message may signify one or more associated graphics commands have been executed by the graphics processing unit. In one embodiment, process 1700 may identify one or more graphics resources associated with the received notification message based on one or more corresponding graphics commands. In another embodiment, a notification message may include one or more identifiers corresponding to one or more graphics resources associated. At block 1723, process 1700 may perform delete operations for each graphics resource associated with the notification message.

At block 1705, process 1700 may update time stamps associated with a graphics resource, such as time stamps 617 of FIG. 15. In one embodiment, process 1700 may update a complete counter in the time stamps of a graphics resource, such as CountC 925 of FIG. 9, according to the number of corresponding graphics commands associated with the graphics resource based on the notification message. At block 1707, process 1700 may retrieve a value of a Finish flag, such as from Flags 619 of the graphics resource status data 613 of FIG. 16, associated with the graphics resource to determine whether the Finish flag is set or not. If the Finish flag is set, in one embodiment, process 1700 may determine if there are outstanding graphics commands associated with the graphics resource at block 1711. In one embodiment, process 1700 may compare the values of a complete counter and a submit counter associated with the graphics resource to make the determination. If there are still outstanding graphics commands associated with the graphics resource, process 1700 may proceed without performing further delete operations for the graphics resource. In one embodiment, process 1700 may make the determination based on whether the values in a complete counter and a submit counter associated with a graphics resource are not equal.

In one embodiment, if there are no more outstanding graphics commands for a graphics resource, for example when both the associated complete counter and submit counter have the same value, process 1700 may send a wake up notification message to a graphics application waiting for finishing graphics operations on the graphics resource at block 1713. One or more graphics processing units may perform graphics operations on a command graphics resource. In one embodiment, the status data associated with the graphics resource, such as graphics resource status data 613 of FIG. 16, may store pointer information for graphics applications waiting to receive wake up notification messages.

Subsequent to checking the Finish flag, in one embodiment, process 1700 may retrieve a value of a Delete flag associated with the graphics resource, such as from Flags 619 of the graphics resource status data 613 of FIG. 16, to determine whether the Delete flag is set or not at block 1709. If the Delete flag is set, in one embodiment, process 1700 may determine if there are outstanding graphics commands associated with a graphics resource at block 1721, similar to block 1711. A Delete flag associated with a graphics resource may be set when a request from an application has been made to delete the graphics resource. If there are no outstanding graphics commands associated with the graphics resource found at block 1721, process 1700 may proceed to delete the graphics resource at block 1719. In one embodiment, graphics processing units may be idle when process 1700 deletes a graphics resource at block 1719. In another embodiment, process 1700 may check operating status of graphics processing units at block 1719 to delete a graphics resource when graphics processing units are idle. After each graphics resource associated with the notification message received at block 1701 has been processed for deletion at block 1723, process 1700 may delete graphics resources associated with a delete pool, such as Delete pool 1511 of FIG. 15 to clean up the delete pool. In one embodiment, process 1700 may synchronize with graphics processing units to delete graphics resources at block 1715 during when graphics processing units are idle.

Asymmetric Two-Pass Graphics Data Scaling

In one embodiment, a two-pass scaling approach utilizing a graphics operation memory and an extra scaling operation may provide an actual scaling effect more desirable than a single scaling operation based on a desired scaling factor which is not representable because of limited bit-precision in a graphics scaling unit. A larger number of discrete values may be explored when scaling up with an up scale factor greater than 1 to arrive at an effective scale factor closer to the desired scale factor than a single scaling operation based on a limited representation of the desired scale factor in the graphics scaling unit.

Figure 18:
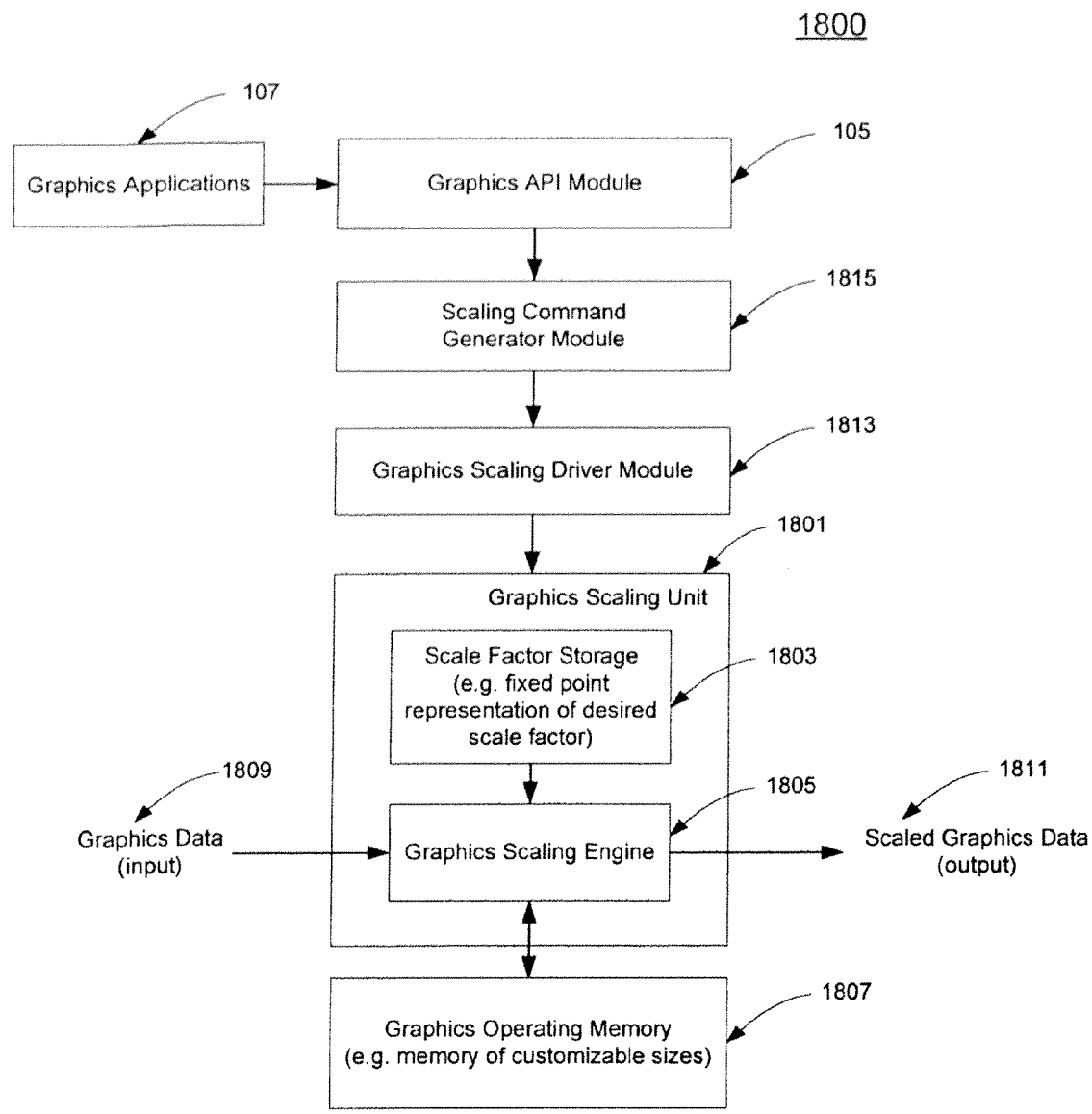
FIG. 18 is a block diagram illustrating one embodiment of a system to scale graphics data.

FIG. 18 is a block diagram illustrating one embodiment of a system to increase graphics scaling precision via two-pass graphics scaling. In one embodiment, system 1800 may be part of system 100 of FIG. 1B. A graphics application 107 may call graphics APIs through a graphics API module 105 to cause a scaling command generator module 1815 to generate scaling commands for graphics scaling driver module 1813. In one embodiment, the graphics scaling driver module generate hardware scaling commands to perform graphics scaling operations at graphics scaling unit 1801. In one embodiment, a graphics application 107, a graphics API module 105, a scaling command generator module 1815 and a graphics scaling driver module 1813 may be based on a host processor separate from the graphics scaling unit 1801.

A graphics scaling unit 1801 may generate a scaled graphics data 1811 from an input graphics data 1809. A graphics memory, such as graphics memory 1001 of FIG. 10, may be coupled with a graphics scaling unit 1801 to store input graphics data 1809 and/or output graphics data 1811. A graphics operating memory 1807 may be a dedicated memory for a graphics scaling unit 1801. In one embodiment, a graphics operating memory 1807 may be customizable with different sizes (memory capacities). A graphics scaling unit 1801 may include a scale factor storage 1803 having a fixed-point representation with a predetermined fixed number of precisions to store a desired scale factor. A graphics scaling engine 1805 in a graphics scaling unit 1801 may perform scaling operations on an input graphic data 1809 according to the desired scale factor 1803.

Figure 19:
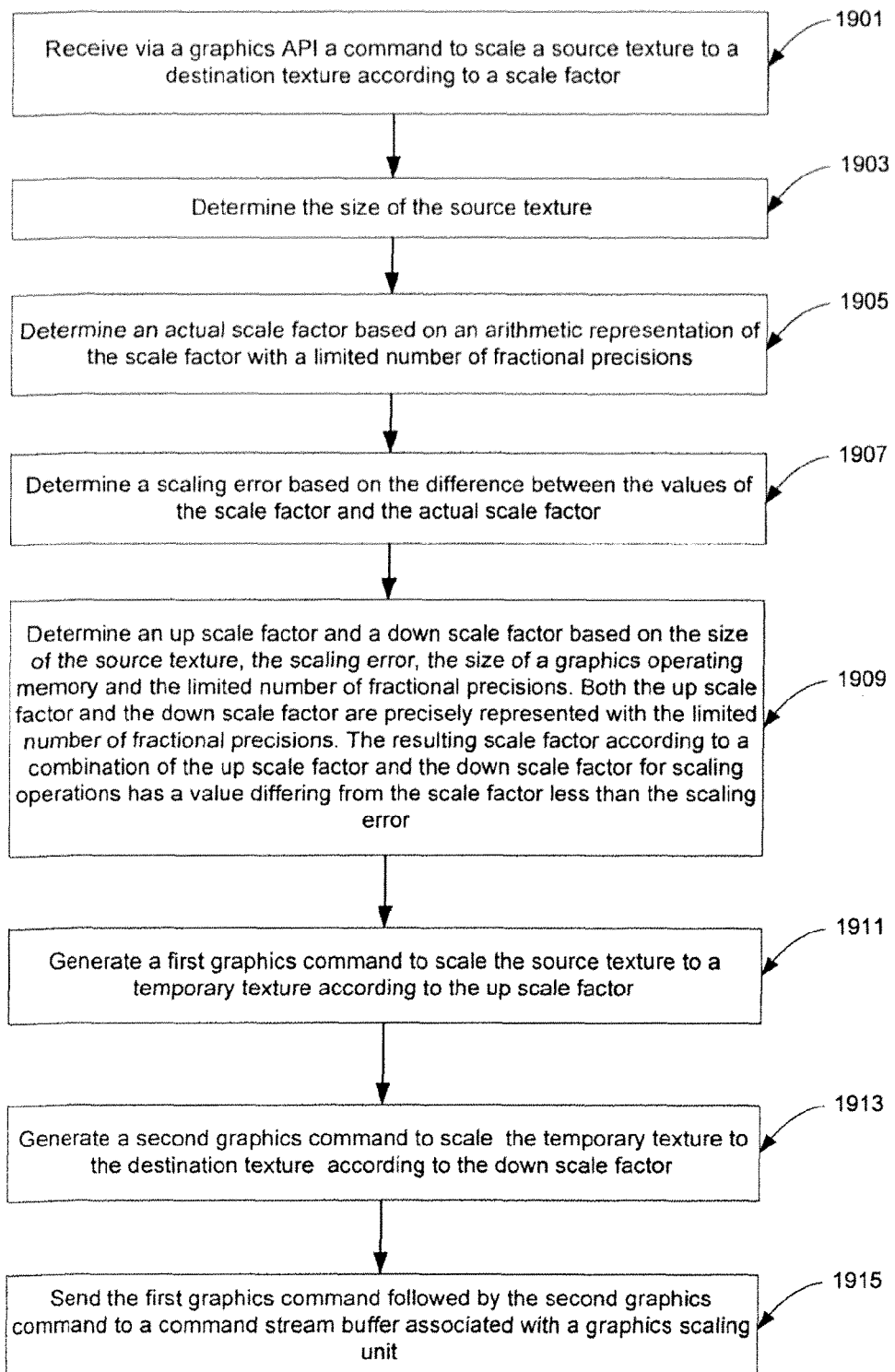
FIG. 19 is a flow diagram illustrating one embodiment of a process to scale graphics data.

FIG. 19 is a flow diagram illustrating one embodiment of a process to increase graphics scaling precision via two-pass graphics scaling. Process 1900 may be performed in accordance with the system of FIG. 18. In one embodiment, process 1900 may receive an API call to scale a source texture to a destination texture according to a desired scale factor at block 1901. A source texture may be the input graphics data 1809 of FIG. 18. A destination texture may be the output graphics data 1811 of FIG. 18. The API call at block 1901 may include the desired scale factor for scaling the source texture. In one embodiment, at block 1903, process 1900 may determine the size of the source texture based on, for example, parameters of the source texture such as width and height. At block 1905, process 1900 may determine an actual scale factor based on a limited precision of an arithmetic representation of the desired scale factor included in an API call at block 1901. The actual scale factor and the associated desired scale factor may differ in value based on the limited number of fractional precisions to store the desired scale factor, such as the scale factor storage 1803 of FIG. 18. At block 1907, process 1900 may determine a scaling error based on the difference between the desired scale factor at block 1901 and the actual scale factor at block 1907.

At block 1909, in one embodiment, process 1900 may determine an up scale factor and a down scale factor which can be precisely represented under the limited number of fractional precisions in the graphics scaling unit to better represent the desired scale factor at block 1901, which may not be precisely represented based on the same number of fractional precisions in the graphics scaling unit. In one embodiment, process 1900 may compare a difference between the desired scale factor and a value by multiplying the up scale factor and the down scale factor against a scaling error determined at block 1907. Process 1900 may determine an up scale factor and a down scale factor such that the difference of block 1907 is smaller than the scaling error. In another embodiment, process 1900 may determine a maximum memory requirement based on an up scale factor, a down scale factor, and a size of the source texture. Process 1900 may determine an up scale factor and a down scale factor such that the maximum memory requirement does not exceed the size of the graphics operating memory.

In one embodiment, process 1900 may employ a binary search scheme among on a plurality of possible up scale factors precisely represented according to a limited fractional precision of arithmetic representation. Process 1900 may determine, based on each selected up scale factor, among all possible numbers precisely represented under the same limited fractional precision of arithmetic representation, a corresponding down scale factor such that multiplication of the selected up scale factor and the corresponding down scale factor has a value closest to the desired scale factor of block 1901. In one embodiment, process 1900 may select an up scale factor such that a combined scale factor with the corresponding down scale factor most closely (or more precisely) representing the desired scale factor among the plurality of possible up scale factors searched.

An up scale factor may be applied in a first pass graphics scaling operation. The corresponding down scale factor may be applied in a second pass graphics scaling operation. A combined scale factor may be based on multiplying an up scale factor and its corresponding down scale factor. In one embodiment, process 1900 may perform a binary search subject to a constraint that the maximum operating memory requirement based on an up scale factor, a corresponding down scale factor and a size of the source texture does not exceed the size of a graphics operating memory associated with the graphics scaling unit. In one embodiment, process 1900 may determine a size requirement for a graphics operating memory based on a maximum scaling error required to scale a source texture according to a limited fractional precision of arithmetic representations for an up scale factor and the corresponding down scale factor.

In one embodiment, at block 1911, process 1900 may generate a first graphics command to scale the source texture to a temporary texture according to an up scale factor. A temporary texture and a source texture may be stored in a graphics memory coupled to a graphics scaling unit, such as graphics memory 1001 of FIG. 10. Subsequently, at block 1913, process 1900 may generate a second graphics command to scale a temporary texture to a destination texture according to a down scale factor. In one embodiment, at block 1915, process 1900 may send a first graphics command and a second graphics command to a command stream buffer, such as command stream buffer associated with a graphics scaling unit for performing the scaling operations.

Figure 20:
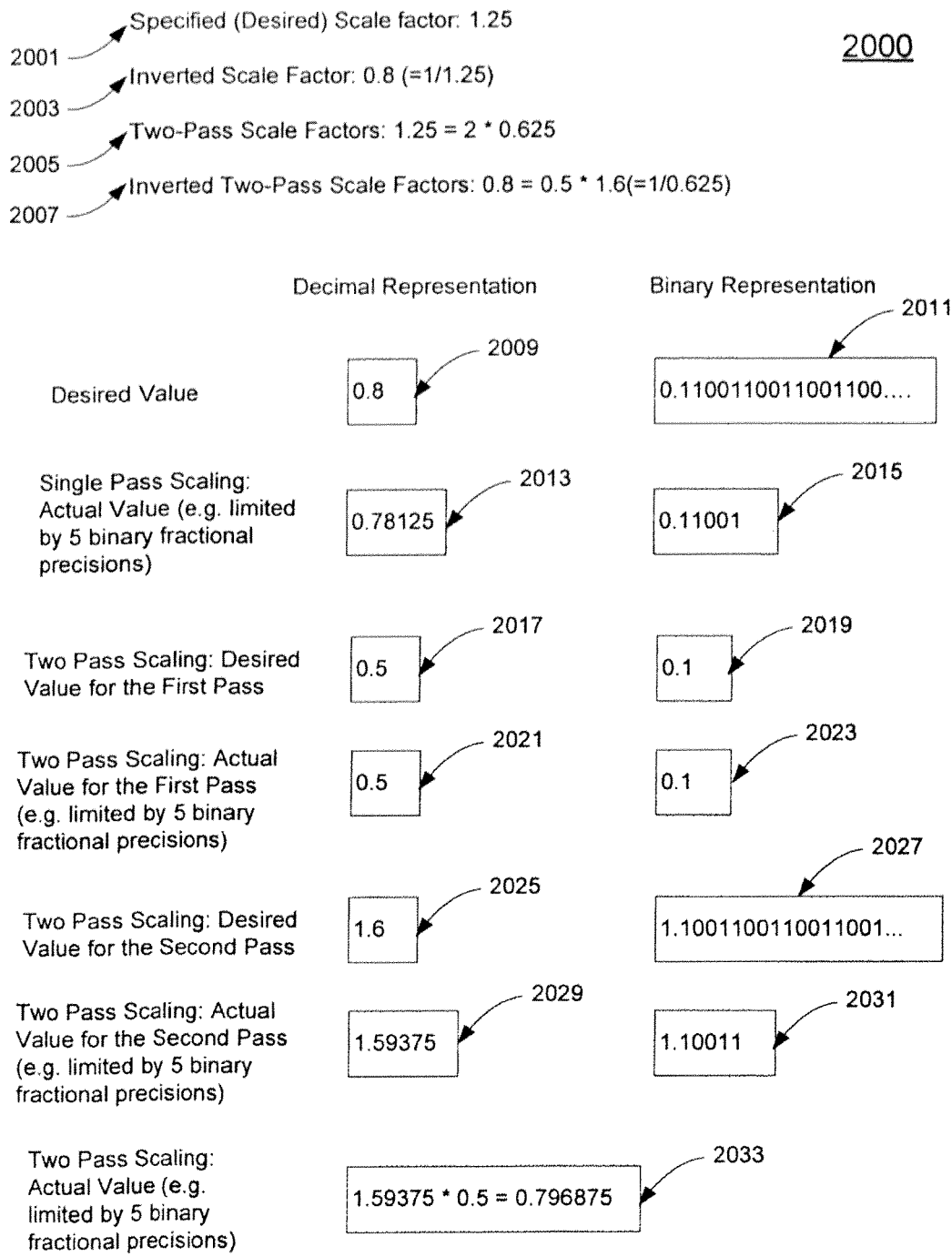
FIG. 20 is an example illustrating a process for scaling graphics data according to one embodiment.

FIG. 20 is an example illustrating an increase of graphics scaling precision via two-pass graphics scaling. A desired scale factor 1.25 2001 may be specified according to graphics APIs. In one embodiment, a graphics scaling unit may represent a desired scale factor as an inverse with 5 binary fractional precisions. An inverted scale factor corresponding to a desired scale factor 1.25 2001 is 0.8 2003. Example 2000 may illustrate an increase in precision based on an up scale factor inverted represented as 0.5 2021 and a corresponding down scale factor inverted represented as 1.59375 2029 for a desired scale factor inverted represented as 0.8 2003. In one embodiment, an up scale factor and a corresponding down scale factor may be selected based on an equation 2005 for the desired scale factor 1.25 2001. Equation 2005 may be inversely represented using two numbers 0.5 and 1.6 2007.

In a single pass scaling, a desired scale factor 0.8 2009, which is binary represented with infinite fractional precisions as 0.1100110011001100 . . . 2001, has an actual value of 0.78125 2013 with 5 binary fractional precisions with a binary representation as 0.11001 2015. Thus, the single pass scaling for desired scale factor 0.8 may have a scaling error of 0.01875. An up scale factor 0.5 2017 for a first pass scaling may be precisely represented with 5 fractional precisions as 0.10000 for binary representation. Thus, the actual up scale factor 2021 with a binary representation 2023 are the same as the up scale factor 2017, 2019. A down scale factor 1.59375 2029 may be selected by representing a desired down scale factor 1.6 2025 for the second pass scaling based on 5 binary fractional precision representation 1.10011 2031. The desired down scale factor 1.6 2025 may be binary represented with infinite fractional precisions as 1.1001100110011001 . . . 2027. The actual combined scale factor based on the up scale factor 2021 and a down scale factor 2029 may be obtained as 0.796875, which corresponds to a smaller scaling error of 0.003125 than 0.01875.

Example of Data Processing System

Figure 21:
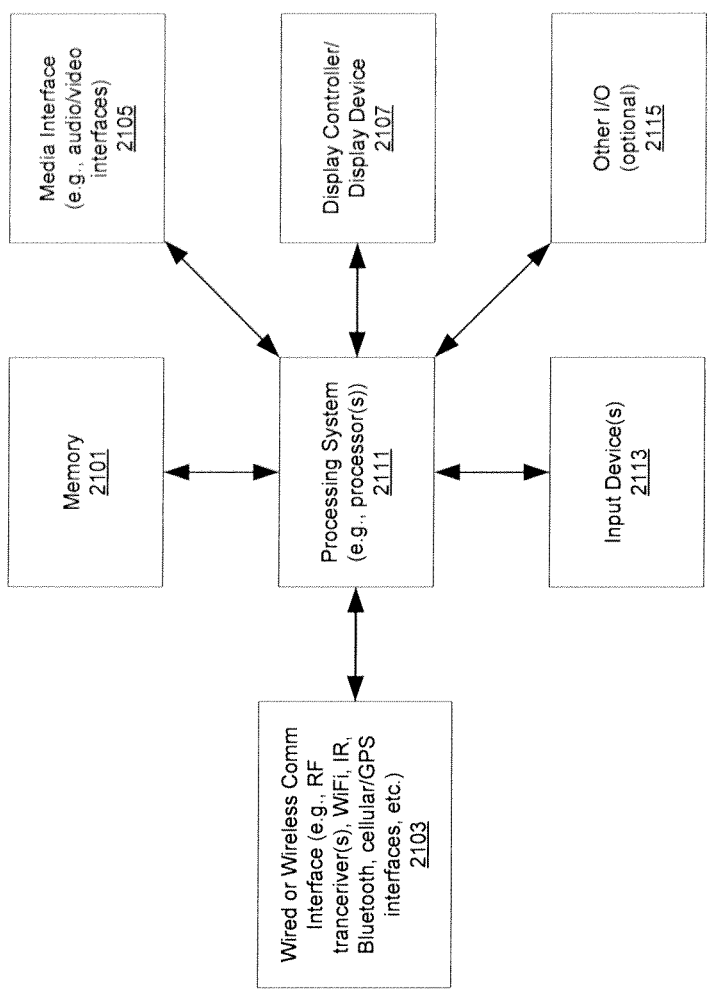
FIG. 21 illustrates one example of a computer system which may be used in conjunction with the embodiments described herein.

FIG. 21 is a block diagram illustrating a data processing system which may be used as another embodiment. The data processing system 2100 shown in FIG. 21 includes a processing system 2111, which may include one or more microprocessors, or which may be a system on a chip integrated circuit, and the system also includes memory 2101 for storing data and programs for execution by the processing system. The system 2100 also includes a media (e.g., audio/video) input/output subsystem 2105 which may include, for example, a microphone and a speaker for, for example, playing back music or providing telephone functionality through the speaker and microphone. A display controller and display device 2107 provide a visual user interface for the user.

This digital interface may include a graphical user interface which is similar to that shown on a typical computer, such as, for example, a Macintosh computer when running OS X operating system software. The system 2100 also includes a communication interface (e.g., wired or wireless communication interface) 2103, such as, for example, one or more wireless transceivers to communicate with another system or device. A wireless transceiver may be a WiFi transceiver, an infrared (IR) transceiver, a Bluetooth transceiver, and/or a wireless cellular telephony transceiver. It will be appreciated that additional components, not shown, may also be part of the system 2100 in certain embodiments, and in certain embodiments fewer components than shown in FIG. 21 may also be used in a data processing system.

The data processing system 2100 also includes one or more input devices 2113 which are provided to allow a user to provide input to the system. These input devices may be a keypad or a keyboard or a touch panel or a multi touch panel. Alternatively, input devices 2113 may include a voice interactive interface that can receive and interact with a voice command. The data processing system 2100 also includes an optional input/output device 2115 which may be a connector for a dock. It will be appreciated that one or more buses, not shown, may be used to interconnect the various components as is well known in the art. The data processing system shown in FIG. 21 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 2100 may be a network computer or an embedded processing device within another device, or other types of data processing systems which have fewer components or perhaps more components than that shown in FIG. 21.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone (s). Examples of a portable media player are described in published U.S. patent application numbers 2003/0095096 and 2004/0224638, both of which are incorporated herein by reference. Other configurations may exist.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method for processing graphics data, the method comprising:
    generating a notification command for a first graphics command and a second graphics command, the first graphics command for rendering first graphics data and the second graphics command for rendering second graphics data the first and second graphics data representing at least a portion of a graphics frame;
    in response to the first and second graphics commands, executing the first graphics command via a first processing unit to render the first graphics data, and executing the second graphics command via a second processing unit to render the second graphics data substantially concurrently, the notification command including identifiers which will be used to indicate completion of the execution of the first graphics command and the second graphics command; and
    notifying a display driver with the identifiers before the completion of the execution of the first graphics command and the second graphics command to update a display with the graphics frame when the first processing unit and the second processing unit have completed rendering the first and second graphics data respectively.

2. The method of claim 1, wherein the first and second graphics commands are received from a plurality of graphics APIs (application programming interfaces).

3. The method of claim 1, wherein the first graphics command and the second graphics command are identified via a frame identifier that identifies the graphics frame.

4. The method of claim 3, further comprising when the first processing unit has completed processing the first graphics data, a first graphics driver associated with the first processing unit sending a first synchronization message to the display driver indicating that the first graphics data has been processed.

5. The method of claim 4, further comprising when the second processing unit has completed processing the second graphics data, a second graphics driver associated with the second processing unit sending a second synchronization message to the display driver indicating that the second graphics data has been processed.

6. The method of claim 5, wherein the display driver does not perform updating the display with the graphics frame until the first and second synchronization messages have been received.

7. The method of claim 6, wherein each of the first arid second synchronization messages includes the identifier identifying the graphics frame, such that the display driver can associate the first and second synchronization messages with the graphics frame for updating.

8. The method of claim 7, wherein the first and second synchronization messages are sent to the display driver asynchronously by the first and second graphics drivers respectively.

9. The method of claim 7, wherein the first graphics driver is notified by the first processing unit when the first graphics data has been processed by the first processing unit, and wherein in response to the notification from the first processing unit, the first graphics driver transmits the first synchronization message to the display driver.

10. The method of claim 7, wherein the second graphics driver is notified by the second processing unit when the second graphics data has been processed by the second processing unit, and wherein in response to the notification from the second processing unit, the second graphics driver transmits the second synchronization message to the display driver.

11. A machine-readable non-transitory storage medium having instructions stored therein which, when executed on a system, cause the system to perform a method for processing graphics data, the method comprising:
  generating a notification command for a first graphics command and a second graphics command, the first graphics command for rendering first graphics data and the second graphics command for rendering second graphics data, the first and second graphics data representing at least a portion of a graphics frame;
  in response to the first and second graphics commands, executing the first graphics command via a first processing unit to render the first graphics data and executing the second graphics command via a second processing unit to render the second graphics data substantially concurrently, the notification command including identifiers which will be used to indicate completion of the execution of the first graphics command and the second graphics command; and
  notifying a display driver with the identifiers before the completion of the execution of the first graphics command and the second graphics command to update a display with the graphics frame when the first processing unit and the second processing unit have completed rendering the first and second graphics data respectively.

12. The machine-readable medium of claim 11, wherein the first and second graphics commands are received from a plurality of graphics APIs (application programming interfaces).

13. The machine-readable medium of claim 11, wherein the first graphics command and the second graphics command are identified via as frame identifier that identifies the graphics frame.

14. The machine-readable medium of claim 13, wherein the method further comprises when the first processing unit has completed processing the first graphics data, a first graphics driver associated with the first processing unit sending a first synchronization message to the display driver indicating that the first graphics data has been processed.

15. The machine-readable medium of claim 14, wherein the method further comprises when the second processing unit has completed processing the second graphics data, a second graphics driver associated with the second processing unit sending a second synchronization message to the display driver indicating that the second graphics data has been processed.

16. The machine-readable medium of claim 15, wherein the display driver does not perform updating the display with the graphics frame until the first and second synchronization messages have been received.

17. The machine-readable medium of claim 16, wherein each of the first and second synchronization messages includes the identifier identifying the graphics frame, such that the display driver can associate the first and second synchronization messages with the graphics frame for updating.

18. The machine-readable medium of claim 17, wherein the first and second synchronization messages arc sent to the display driver asynchronously by the first and second graphics drivers respectively.

19. The machine-readable medium of claim 17, wherein the first graphics driver is notified by the first processing unit when the first graphics data has been processed by the first processing unit, and wherein in response to the notification from the first processing unit, the first graphics driver transmits the first synchronization message to the display driver.

20. The machine-readable medium of claim 17, wherein the second graphics driver is notified by the second processing unit when the second graphics data has been processed by the second processing unit, and wherein in response to the notification from the second processing unit, the second graphics driver transmits the second synchronization message to the display driver.

21. A data processing system, comprising:
  a first processing unit, in response to a first graphics command, to execute the first graphics command to process first graphics data of a graphics frame;
  a second processing unit, in response to a second graphics command, to execute the second graphics command to process second graphics data of the graphics frame substantially concurrently;
  the data processing system to generate a notification command for the first graphics command and the second graphics command, the notification command including identifiers indicating completion of the execution of the first graphics command and the execution of the second graphics command; and
  a display driver coupled to the first and second processing units, in response to receiving the notification command with the identifiers before the completion of the execution of the first graphics command and the second graphics command, to update the graphics frame based on the first and second graphics date when the first and second processing units have completed processing the first and second graphics data.

22. An apparatus for processing graphics data comprising:
  means for generating a notification command for a first graphics command and a second graphics command, the first graphics command for rendering first graphics data and the second graphics command for rendering second graphics data the first and second graphics data representing at least a portion of a graphics frame;

in response to the first and second graphics commands, means for executing the first graphics command via a first processing unit to render the first graphics data and executing the second graphics command via a second processing unit to render the second graphics data substantially concurrently, the notification command including identifiers which will be used to indicate completion of the execution of the first graphics command and the second graphics command; and means for notifying a display driver with the identifiers before the completion of the execution of the first graphics command and the second graphics command to update a display with the graphics frame when the first processing unit and the second processing unit have completed rendering the first and second graphics data respectively.

23. A computer implemented method for processing graphics data, the method comprising:

receiving a notification before completion of processing of first graphics data of a graphics frame by a first processing unit and completion of processing of second graphics data of the graphics frame by a second processing unit, the notification having identifiers for indicating the completion of the processing of the first graphics data and the completion of the processing of the second graphics data;

receiving a first synchronization message from a first driver driving the first processing unit, the first synchronization message having a first identifier indicating that the first processing unit has completed the processing of the first graphics data;

receiving a second synchronization message from a second driver driving the second processing unit, the second synchronization message having a second identifier indicating that the second processing unit has completed the processing of the second graphics data, wherein the first and second graphics data are processed substantially concurrently and wherein the first and second graphics data represent at least a portion of a graphics frame; and in response to the first and second synchronization messages, updating a display with the graphics frame based on the first and second graphics data, wherein the graphics frame is not updated until all of the first and second synchronization messages are received.

24. The method of claim 23, further comprising:

examining the first and second synchronization messages to determine whether there is another synchronization message that has not been received corresponding to another graphics data of the graphics frame; and performing updating the display with the graphics frame if there is no more synchronization message to be received for the graphics frame.

25. The method of claimed 24, further comprising suspending updating the display with the graphics frame until all synchronization messages have been received, if it is determined that there are more synchronization messages to be received.

26. The method of claim 25, wherein the graphics frame is identified by a frame identifier and wherein the first and second synchronization messages are associated with the frame identifier, such that the first and second synchronization messages can he associated with the graphics frame to be updated.

27. A machine-readable non-transitory storage medium having instructions stored therein which, when executed on a system, cause the system to perform a method for processing graphics data, the method comprising:

receiving a notification before completion of processing of first graphics data of a graphics frame by a first processing unit and completion of processing of second graphics data of the graphics frame by a second processing unit, the notification having identifiers for indicating the completion of the processing of the first graphics data and the completion of the processing of the second graphics data;

receiving a first synchronization message from a first driver driving the first processing unit, the first synchronization message having a first identifier indicating that the first processing unit has completed the processing of the first graphics data;

receiving a second synchronization message from a second driver driving the second processing unit, the second synchronization message having a second identifier indicating that the second processing unit has completed the processing of the second graphics data, wherein the first and second graphics data are processed substantially concurrently and wherein the first and second graphics data represent at least a portion of a graphics frame; and in response to the first and second synchronization messages, updating a display with the graphics frame based on the first and second graphics data, wherein the graphics frame is not updated until all of the first and second synchronization messages are received.

28. machine-readable medium of claim 27, wherein the method further comprises:

examining the first and second synchronization messages to determine whether there is another synchronization message that has not been received corresponding to another graphics data of the graphics frame; and performing updating the display with the graphics frame if there is no more synchronization message to be received for the graphics frame.

29. The machine-readable medium of claim 28, wherein the method further comprises suspending updating the display with the graphics frame until all synchronization messages have been received, if it is determined that there are more synchronization messages to be received.

30. The machine-readable medium of claim 29, wherein the graphics frame is identified by a frame identifier and wherein the first and second synchronization messages are associated with the frame identifier, such that the first and second synchronization messages can be associated with the graphics frame to be updated.

31. An apparatus for processing graphics data, comprising;

means for receiving a notification before completion of processing of first graphics data of a graphics frame by a first processing unit and completion of processing of second graphics data of the graphics frame by a second processing unit, the notification having identifiers for indicating the completion of the processing of the first graphics data and the completion of processing of the second graphics data;

means for receiving a first synchronization message from a first driver driving the first processing unit, the first synchronization message having a first identifier indicating that the first processing unit has completed the processing of the first graphics data;

means for receiving a second synchronization message, the second synchronization message having a second identifier indicating that the second processing unit has completed the processing of the second graphics data, wherein the first and second graphics data are processed substantially concurrently and wherein the first and second graphics data represent at least a portion of a graphics frame; and in response to the first and second synchronization messages, means for updating a display with the graphics frame based on the first and second graphics data, wherein the graphics frame is not updated until all of the first and second synchronization messages are received.

32. A computer implemented method for processing graphics data, the method comprising:

receiving a swap command from a graphics API (application programming interface), the swap command being identified by a swap identifier (ID) identifying a graphics frame, the swap command having identifiers for a plurality of graphics commands for rendering a plurality of segments of graphics data associated with the graphics frame, wherein the graphics commands are processed by a plurality of processing units substantially concurrently, wherein the swap command is received before completion of processing the graphics commands by the processing units for rendering the segments of graphics data;

receiving a synchronization command from each of the processing units, the synchronization command having a separate identifier indicating that the respective processing unit has completed processing the respective segment of the graphics data according to the identifiers;

examining the synchronization command from each processing unit to determine whether the synchronization command is the last one representing the last segment of the graphics data processed by the processing units;

updating a display with the graphics frame if the synchronization commands for all segments of the graphics data associated with the graphics frame have been received according to the identifiers; and suspending updating the graphics frame if there are more synchronization commands to be received, until all of the synchronization commands are received.

33. The method of claim 32, wherein rendered segments of the graphics data are stored in a memory by each processing unit prior to receiving a synchronization command associated with each processing unit, and wherein the rendered segments of the graphics data are fetched from the memory for updating the display when all the synchronization commands have been received.

34. A machine-readable non-transitory storage medium having instructions stored therein which, when executed on a system, cause the system to perform a method for processing graphics data, the method comprising:

receiving a swap command from a graphics API (application programming interface), the swap command being identified by a swap identifier (ID) identifying a graphics frame, the swap command having identifiers for a plurality of graphics commands for rendering a plurality of segments of graphics data associated with the graphics frame, wherein the graphics commands are processed by a plurality of processing units substantially concurrently, wherein the swap command is received before completion of processing the graphics commands by the processing units for rendering the segments of graphics data;

receiving a synchronization command from each of the processing units, the synchronization command having a separate identifier indicating that the respective processing unit has completed processing the respective segment of the graphics data according to the identifiers;

examining the synchronization command from each processing unit to determine whether the synchronization, command is the last one representing the last segment of the graphics data processed by the processing units;

updating a display with the graphics frame if the synchronization commands for all segments of the graphics data associated with the graphics frame have been received; and suspending updating the graphics frame if there are more synchronization commands to he received, until all of the synchronization commands are received.

35. The machine-readable medium of claim 34, wherein rendered segments of the graphics data are stored in a memory by each processing unit prior to receiving a synchronization command associated with each processing unit, and wherein the rendered segments of the graphics data are fetched from the memory for updating the display when all the synchronization commands have been received.

* * * * *